United States Patent
Hosono et al.

(10) Patent No.: US 10,322,940 B2
(45) Date of Patent: Jun. 18, 2019

(54) COMPOSITE, METHOD FOR PRODUCING COMPOSITE, AMMONIA SYNTHESIS CATALYST, AND AMMONIA SYNTHESIS METHOD

(71) Applicants: JAPAN SCIENCE AND TECHNOLOGY AGENCY, Kawaguchi-shi (JP); TOKYO INSTITUTE OF TECHNOLOGY, Meguro-ku (JP)

(72) Inventors: Hideo Hosono, Tokyo (JP); Michikazu Hara, Tokyo (JP); Masaaki Kitano, Tokyo (JP); Toshiharu Yokoyama, Tokyo (JP); Yasunori Inoue, Tokyo (JP)

(73) Assignees: JAPAN SCIENCE AND TECHNOLOGY AGENCY, Kawaguchi-shi (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 68 days.

(21) Appl. No.: 15/532,877

(22) PCT Filed: Dec. 4, 2015

(86) PCT No.: PCT/JP2015/084207
§ 371 (c)(1),
(2) Date: Jun. 2, 2017

(87) PCT Pub. No.: WO2016/088896
PCT Pub. Date: Jun. 9, 2016

(65) Prior Publication Data
US 2017/0355607 A1    Dec. 14, 2017

(30) Foreign Application Priority Data
Dec. 5, 2014  (JP)  .................... 2014-246717

(51) Int. Cl.
*C01B 3/04* (2006.01)
*C01C 1/04* (2006.01)
(Continued)

(52) U.S. Cl.
CPC .......... *C01C 1/0411* (2013.01); *B01J 23/462* (2013.01); *B01J 27/24* (2013.01); *B01J 35/1014* (2013.01);
(Continued)

(58) Field of Classification Search
None
See application file for complete search history.

(56) References Cited

U.S. PATENT DOCUMENTS

| 1,159,364 A | 11/1915 | Jahn |
| 3,148,157 A | 9/1964 | Pollitzer et al. |

(Continued)

FOREIGN PATENT DOCUMENTS

| CN | 103977828 A | 8/2014 |
| CN | 105013519 A * | 11/2015 |

(Continued)

OTHER PUBLICATIONS

International Search Report dated Jan. 19, 2016 in PCT/JP2015/084207 filed Dec. 4, 2015.
(Continued)

*Primary Examiner* — Anthony J Zimmer
(74) *Attorney, Agent, or Firm* — Oblon, McClelland, Maier & Neustadt, L.L.P.

(57) ABSTRACT

An ammonia synthesis catalyst having high activity is obtained by having a two-dimensional electride compound having a lamellar crystal structure such as Ca$_2$N support a transition metal. However, since the two-dimensional electride compound is unstable, the stability of the catalyst is low. In addition, in cases where a two-dimensional electride
(Continued)

compound is used as a catalyst support, it is difficult to shape the catalyst depending on reactions since the two-dimensional electride compound has poor processability. A composite which includes a transition metal, a support and a metal amide compound, wherein the support is a metal oxide or a carbonaceous support; and the metal amide compound is a metal amide compound represented by general formula (1).

$$M(NH_2)_x \quad (1)$$

(In general formula (1), M represents at least one metal atom selected from the group consisting of Li, Na, K, Be, Mg, Ca, Sr, Ba and Eu; and x represents the valence of M.).

11 Claims, 6 Drawing Sheets

(51) Int. Cl.
| | |
|---|---|
| B01J 21/18 | (2006.01) |
| B01J 23/46 | (2006.01) |
| B01J 23/58 | (2006.01) |
| B01J 23/63 | (2006.01) |
| B01J 27/24 | (2006.01) |
| B01J 35/00 | (2006.01) |
| B01J 35/10 | (2006.01) |
| B01J 37/00 | (2006.01) |
| B01J 37/02 | (2006.01) |
| B01J 37/04 | (2006.01) |
| B01J 37/08 | (2006.01) |
| B01J 23/648 | (2006.01) |
| C01B 21/092 | (2006.01) |

(52) U.S. Cl.
CPC ....... *B01J 37/0072* (2013.01); *B01J 37/0205* (2013.01); *B01J 37/0209* (2013.01); *B01J 37/04* (2013.01); *B01J 37/08* (2013.01); *B01J 37/082* (2013.01); *B01J 37/086* (2013.01); *C01B 3/047* (2013.01); *C01B 21/0923* (2013.01); *C01B 21/0926* (2013.01); *B01J 21/18* (2013.01); *B01J 23/58* (2013.01); *B01J 23/63* (2013.01); *B01J 23/648* (2013.01); *B01J 35/006* (2013.01); *B01J 35/0046* (2013.01); *B01J 35/0066* (2013.01); *B01J 35/1019* (2013.01); *C01P 2004/04* (2013.01); *Y02E 60/364* (2013.01); *Y02P 20/52* (2015.11)

(56) References Cited

U.S. PATENT DOCUMENTS

| | | | |
|---|---|---|---|
| 3,770,658 | A | 11/1973 | Ozaki et al. |
| 6,235,676 | B1 | 5/2001 | Jacobsen et al. |
| 2003/0065209 | A1 | 4/2003 | Ionkin |
| 2004/0057891 | A1 | 3/2004 | Nielsen et al. |
| 2006/0127304 | A1 | 6/2006 | Fujii et al. |
| 2012/0225005 | A1 | 9/2012 | Suzuki et al. |
| 2016/0271595 | A1 | 9/2016 | Chen et al. |
| 2016/0361712 | A1 | 12/2016 | Hosono et al. |
| 2017/0342449 | A1 | 11/2017 | Kishino et al. |

FOREIGN PATENT DOCUMENTS

| | | |
|---|---|---|
| CN | 105013519 A | 11/2015 |
| EP | 3 081 294 A1 | 10/2016 |
| EP | 3 260 418 A1 | 12/2017 |
| GB | 199032 A | 3/1924 |
| GB | 253540 A | 1/1927 |
| GB | 1 565 074 | 4/1980 |
| JP | 51-47674 | 12/1976 |
| JP | 54-37592 B1 | 11/1979 |
| JP | 59-16816 B2 | 4/1984 |
| JP | 2-286638 A | 11/1990 |
| JP | 2000-264625 A | 9/2000 |
| JP | 2004-35399 A | 2/2004 |
| JP | 2006-8440 A | 1/2006 |
| JP | 2006-51473 A | 2/2006 |
| JP | 2008-13435 A | 1/2008 |
| JP | 2008-73582 A | 4/2008 |
| JP | 2010-222213 A | 10/2010 |
| JP | 4585043 B1 | 11/2010 |
| JP | 2011-178648 A | 9/2011 |
| JP | 2012-66991 A | 4/2012 |
| JP | 2014-24712 A | 2/2014 |
| WO | 2015/129471 A1 | 9/2015 |

OTHER PUBLICATIONS

P. Hoehn, et al., "(β-Ca3N2, a Metastable Nitride in the System Ca—N," Chemistry—A European Journal, vol. 15, 2009, pp. 3419-3425.

K. Lee, et al., "Dicalcium nitride as a two-dimensional electride with an anionic electron layer," Nature, vol. 494, Feb. 21, 2013, 6 pages.

Y. J. Kim, et al., "The scalable pinacol coupling reaction utilizing the inorganic electride [Ca2N]+*e-as an electron donor," Chemical Communications, vol. 50, 2014, 5 pages.

I. V. Gostunskaya, et al., "Izomerizatsiya Monoolefinovykh Uglevodorodov Pri Deystvii Amida Kal'Tsiya," Doklady Akademii Nauk SSSR, vol. 108, 1956, pp. 473-476.

Y. Ono, et al., "Selective reactions over solid base catalysts," Catalysis Today, vol. 38, 1997, pp. 321-337.

K. Aika, et al., "Support and Promoter Effect of Ruthenium Catalyst," Journal of Catalysis, vol. 92, 1985, pp. 305-311.

F. Rosowski, et al., "Ruthenium catalysts for ammonia synthesis at high pressures: Preparation, characterization, and power-law kinetics," Applied Catalysis A: General, vol. 151, 1997, pp. 443-460.

Extended European Search Report issued Jul. 3, 2018 in Patent Application No. 15864436.9, 15 pages.

Ma, L. et al., "Catalytically Enhanced Hydrogen Storage Properties of Mg(NH2)2+2LiH Material by Graphite-Supported Ru Nanoparticles", Journal of Physical Chemistry C, vol. 112, 2008, XP055485821, pp. 18280-18285.

Forni, L. et al., "Carbon-supported promoted Ru catalyst for ammonia synthesis", Applied Catalysis A: General, vol. 185, 1999, XP004272107, pp. 269-275.

Guo, J. et al., "Electronic promoter or reacting species? The role of LiNH2 on Ru in catalyzing NH3 decomposition", Chemical Communications, vol. 51, 2015, XP055485900, pp. 15161-15164.

Guo, J. et al., "Supporting Information for Electronic promoter or reacting species? The role of LiNH2 on Ru in catalyzing NH3 decomposition", Electronic Supplementary Material (ESI) for Chemical Communications, The Royal Society of Chemistry, 2015, XP055486035, 12 pages.

* cited by examiner

COMPOSITE, METHOD FOR PRODUCING COMPOSITE, AMMONIA SYNTHESIS CATALYST, AND AMMONIA SYNTHESIS METHOD

TECHNICAL FIELD

The present invention relates to a composite containing a transition metal, a support and a metal amide, a supported metal catalyst using the composite, an ammonia synthesis catalyst, and a method of synthesizing ammonia.

BACKGROUND ART

Alkaline earth metal nitrides such as $Ca_3N_2$, $Sr_3N_2$, $Ba_3N_2$ or the like are compounds which are used as raw materials of aluminum nitride for semiconductor devices, ceramic particles for metal sliding members, battery electrode constituent materials, conductive fine particles, or the like. Patent Document 1 discloses a method of producing an alkaline earth metal nitride by thermally decomposing a corresponding alkaline earth metal amide. In addition, Patent Document 2 discloses a method of producing a high purity metal nitride by reacting ammonia with an alkaline earth metal to make it liquid-phase, and then thermally decomposing the obtained metal amide compound.

Patent Document 3 discloses a method for producing a metal amide compound by reacting a metal hydride or a metal hydride in which a simple substance metal or an alloy is further added with liquid ammonia. As another method of producing metal amide such as $LiNH_2$, $Ca(NH_2)_2$ or the like by enclosing a metal such as Li or Ca or a compound thereof in a reaction vessel, and after cooling, introducing ammonia having a volume ratio of 10 times or more with respect to metal and liquefying the ammonia, and then reacting them while stirring (Patent Document 4).

Calcium nitride which is a typical alkaline earth metal nitride is known as $\alpha$-$Ca_3N_2$, $\beta$-$Ca_3N_2$, $\gamma$-$Ca_3N_2$, $Ca_{11}N_8$, $Ca_2N$, or the like. $Ca_2NH$, $CaNH$, $Ca(NH_2)_2$ or the like which are hydrides of calcium nitrides (hereinafter also referred to as "Ca—N—H based compounds") are also known.

It is known that $Ca_2N$ is a very chemically unstable substance. For example, it is readily oxidized. It has been reported that $Ca_2N$ can stably exist at 1000° C. or less in Ar, or between 250° C. and 800° C. in nitrogen (Non-Patent Document 1).

On the other hand, the present inventors have found that a nitride represented by $AE_2N$ (AE represents at least one element selected from Ca, Sr, and Ba) is a "two-dimensional electride compound" having high conductivity (see Patent Document 5). The two-dimensional electride compound $AE_2N$ is a layered compound in which electron ($e^-$) is bound as an anion between layers composed of $[AE_2N]^+$. That is, it can also be expressed as $AE_2N^+$:$e^-$ in the ionic formula.

For example, $Ca_2N$, which is a typical two-dimensional electride compound, is obtained by heating $Ca_3N_2$ and metal Ca in vacuum. It has been reported that the conduction electron concentration of $Ca_2N$ is $1.4 \times 10^{22}$/cm$^3$ and has a work function of 2.6 eV (Non-Patent Document 2). Thereafter, an example in which this two-dimensional electride is used as a reducing agent for pinacol coupling has been reported (Non-Patent Document 3).

It has been reported that $Ca(NH_2)_2$ acts as a base catalyst and exhibits catalytic activity against an isomerization reaction of olefins such as 2-methyl-1-butene (Non-Patent Document 4). Another example is a catalyst in which an amide compound of Na, K, Eu, Yb is supported on an oxide support such as $Al_2O_3$. It exhibits catalytic activity for an olefin isomerization reaction such as 2-methyl-1-butene has been reported (Non-Patent Document 5). It has been reported that each example functions as a base catalyst.

For ammonia synthesis, a method using a catalyst containing $Fe_3O_4$ and several mass % of $Al_2O_3$ and $K_2O$ in $Fe_3O_4$(Haber-Bosch method) is generally used. In addition, iron-based catalysts and Ru-based catalysts (for example, Ru/MgO, Ru/CaO, Ru—Cs/MgO) have been studied as synthesis methods other than the Harbor-Bosch method (Non-Patent Documents 6 and 7). These catalysts are catalysts in which a transition metal having ammonia synthesizing activity is supported on a support, and are generally referred to as "supported metal catalysts".

Other supported metal catalysts for ammonia synthesis include transition metals of Group 8 or 9 of the Periodic Table such as Fe, Ru, Os, Co, nitrides of transition metals of Group 8 or 6B of the periodic table, composite nitrides of Co.Mo and the like are used (Patent Documents 6 to 9). Also, an ammonia synthesis catalyst is known in which $Al_2O_3$, $SiO_2$, $Mg_2O$ or magnesium aluminum spinel is used as a sub-support and Ru is supported on silicon nitride or boron nitride supported thereon (Patent Document 10).

Then, the present inventors have found that a transition metal supported on the two-dimensional electride becomes an ammonia synthesis catalyst having high activity. Specifically, a supported metal catalyst in which a transition metal such as Ru or Fe was supported on a metal nitride represented by $M_xN_yH_z$ (M is Mg, Ca, Sr, And Ba, x is an integer satisfying $1 \leq x \leq 11$, y satisfies $1 \leq y \leq 8$ and z satisfies $0 \leq z \leq 4$.) or its hydride is a catalyst for ammonia synthesis (Patent Document 11). However, there is no report regarding a composite in which a metal amide compound and a metal are supported on a support, and a supported metal catalyst of the same.

PATENT LITERATURE

Patent Document 1: Japanese Unexamined Patent Publication No. 2011-178648
Patent Document 2: Japanese Unexamined Patent Publication No. 2012-66991
Patent Document 3: Japanese Unexamined Patent Publication No. 2006-8440
Patent Document 4: Japanese Unexamined Patent Publication No. 2010-222213
Patent Document 5: Japanese Unexamined Patent Publication No. 2014-24712
Patent Document 6: Japanese Examined Patent Publication No. 51-47674
Patent Document 7: Japanese Examined Patent Publication No. 54-37592
Patent Document 8: Japanese Examined Patent Publication No. 59-16816
Patent Document 9: Japanese Unexamined Patent Publication No. 2000-264625
Patent Document 10: Japanese Unexamined Patent Publication No. 2004-35399
Patent Document 11: WO2015/129471

NON-PATENT LITERATURE

Non-Patent Document 1: P. Hehn, S. Hoffmann, J. Hunger, S. Leoni, F. Nitsche, W. Schnelle, R. Kniep, Chem. Eur. J., 15, 3419 (2009)

Non-Patent Document 2: K. Lee, S. W. Kim, Y Toda, S. Matsuishi and H. Hosono "Nature", 494, 336-341 (2013)

Non-Patent Document 3: Y. J. Kim, S. M. Kim, H. Hosono, J. W. Yang and S. W. Kim, Chemical Communications, 50, 4791-4794 (2014)

Non-Patent Document 4: I. V. Gostunskaya, N. I. Tyun'kina and B. A. Kazanskii, Doklady Akademii Nauk SSSR, 108, 473-6 (1956)

Non-Patent Document 5: Y Ono and T. Baba, Catalysis Today, 38, 321-337 (1997)

Non-Patent Document 6: K. Aika, A. Ohya, A. Ozaki, Y. Inoue, I. Yasumori, Journal of Catalysis, 92, 305-311 (1985)

Non-Patent Document 7: F. Rosowski, A. Hornung, O. Hinrichsen, D. Herein, M. Muhler, G Ertl, Applied Catalysis A: General, 151, 443-460 (1997)

SUMMARY OF THE INVENTION

Problem to be Solved by Invention

Two-dimensional electride compounds are conventionally produced from metal nitrides and metals as raw materials. However, in this production method, after mixing these raw materials, reaction at high temperature and for a long time is required. Specifically, taking $Ca_2N$ production as an example, $Ca_2N$ is obtained by mixing $Ca_3N_2$ and Ca metal and heating at 800° C. for 100 hours under vacuum conditions (Non-Patent Document 2). That is, extremely severe production conditions are required for production of two-dimensional electride compounds. Therefore, a simpler production method for using the performance of the two-dimensional electride compound is required.

On the other hand, an ammonia synthesis method of the Haber-Bosch method usually requires a high pressure of 20 MPa or more. For this reason, a high-pressure reaction apparatus is required, so that a method for producing ammonia at lower pressure is required. In recent years, an ammonia synthesis method using a supported metal catalyst has been studied, but the performance is still insufficient, and a catalyst capable of reacting at a lower pressure than the Haber-Bosch method is not found.

The inventors of the present invention have found that a catalysis in which a transition metal is supported on a two-dimensional electride compound becomes an ammonia synthesis catalyst having high activity. However, since the two-dimensional electride compound itself is unstable, there is a problem that stability as a catalyst is low. Furthermore, when a two-dimensional electride compound is used as a catalyst support, there is a problem that processability is poor and it is difficult to mold a catalyst according to the reaction. Furthermore, a BET specific surface area when $Ca_2N$ was used as a support was measured and found to be about 1 $m^2/g$. There was also a problem that when a transition metal is supported, particles of the supported transition metal became large and cannot be supported in high dispersion.

Means for Solving the Problem

As a result of intensive studies to solve the above-mentioned problems, the present inventors have found a composite in which a metal amide compound represented by the general formula (1) (hereinafter sometimes referred to as "metal amide") is supported on a specific support, and then a transition metal as a catalysis metal is further supported on them; and a production method thereof. The present invention has been completed based on the above findings.

That is,

[1] A composite comprising a transition metal, a support, and a metal amide compound, wherein the support is a metal oxide or a carbonaceous support, and the metal amide compound is a compound represented by the following general formula (1), $$M(NH_2)_x \qquad (1)$$

wherein M represents at least one metal atom selected from the group consisting of Li, Na, K, Be, Mg, Ca, Sr, Ba and Eu, and x represents the valence of M.

[2] The composite according to the above [1], wherein the support is a basic, neutral, or weakly acidic metal oxide.

[3] The composite according to [1] or [2], wherein the support is at least one metal oxide selected from the group consisting of $ZrO_2$, $TiO_2$, $CeO_2$, $Al_2O_3$, $Nb_2O_5$, $Ta_2O_5$ and MgO.

[4] The composite according to any one of the above [1] to [3], wherein the composite has a BET specific surface area of 10 $m^2/g$ or more,

[5] The composite according to any one of the above [1] to [4], wherein the metal atom M is Ca.

[6] The composite according to any one of [1] to [5], wherein the transition metal is Ru,

[7] A supported metal catalyst including the composite according to any one of the above [1] to [6]

[8] An ammonia synthesis catalyst including the composite according to any one of the above [1] to [6]

[9] A method of producing a composite according to any one of the above [1] to [6], including steps of mixing a metal atom source containing the metal atom M, the support, and liquid ammonia, and obtaining a metal amide-supporting support by reacting a metal atom source with liquid ammonia to produce the metal amide compound on the support.

[10] The method for producing a transition metal compound according to [9], comprising steps of supporting a raw material compound of a transition metal (hereinafter referred to as a transition metal raw material) on the metal amide-supporting support and depositing the transition metal by thermally decomposing the transition metal raw material.

[11] A method for synthesizing ammonia, including a step of bringing a gas containing nitrogen and a gas containing hydrogen into contact with the ammonia synthesis catalyst described in [8] to synthesize ammonia.

[12] The ammonia synthesis method according to the above [11], wherein the temperature at the time of contact with the ammonia synthesis catalyst is 100° C. or more and 600° C. or less,

[13] The ammonia synthesis method according to [11] or [12], wherein the pressure at the time of contact with the ammonia synthesis catalyst is 10 kPa or more and 20 MPa or less.

Effect of the Invention

The composite of the present invention can be produced without requiring high temperature and long-time reaction, and can more easily use the properties of the two-dimensional electride compound. Since the composite of the present invention can be obtained without carrying out a reaction at high temperature and for long time during its production process, it is a composite in which the transition metal is supported with high dispersion. Therefore, the composite of the present invention has high performance as a supported metal catalyst, particularly as an ammonia synthesis catalyst.

When the composite of the present invention is used as an ammonia synthesis catalyst, it shows higher catalytic activity than the supported metal catalyst described in Patent Document 11. That is, it is advantageous in that it is possible to produce ammonia with a high reaction efficiency.

When used as an ammonia synthesis catalyst, the composite of the present invention stably produces ammonia even if a reaction is continued for a long time, and the reaction activity hardly decreases. Since a catalyst life is long, it is advantageous in that ammonia can be produced with high production efficiency.

In the method for producing a composite of the present invention, the composite of the present invention can be produced without requiring high temperature and long-time reaction. Therefore, it is possible to obtain a composite in which the transition metal is supported with high dispersion, which is advantageous in the production of a supported metal catalyst, particularly an ammonia synthesis catalyst.

In the ammonia synthesis method of the present invention, ammonia can be synthesized with a relatively inexpensive catalyst containing a metal amide and a support including an inexpensive metal oxide or a carbonaceous support. By using the composite of the present invention, it is possible to synthesize ammonia with a low reaction pressure. That is, ammonia can be synthesized with high efficiency and with long-term chemical and thermal stability.

It is also possible to obtain sufficient reaction activity even when a transition metal element such as Fe or Co other than an expensive rare metal such as Ru is used as a catalytic metal. It is also useful from the viewpoint of effective utilization of resources.

When the composite of the present invention is used as a supported metal catalyst, it is possible to be used as a catalyst in various reactions, for example, it is advantageous in that an ammonia decomposition reaction can be promoted.

DETAILED DESCRIPTION OF THE INVENTION

Figure 1:
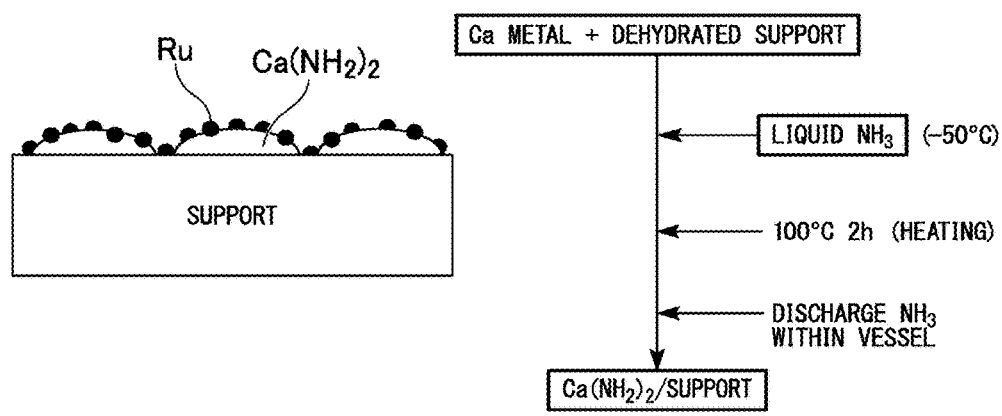
FIG. 1 is a schematic diagram of an example of a composite of the present invention and a production flow of an example of the composite.

Hereinafter, the present invention will be described in detail.

<Composite>

The composite of the present invention contains a transition metal, a support and a metal amide compound. Specifically, the composite of the present invention contains a support to be described below, a metal amide compound to be described later, and a transition metal. More specifically, the metal amide compound is supported on the support, and a transition metal is further supported on the metal amide compound. Preferably, it has a structure in which the metal amide and the transition metal are stacked in this order on the support.

The structure of the composite is not particularly limited. The metal amide and the transition metal may be stacked on a planar support in this order or may be a so-called core-shell type structure in which the metal amide and the transition metal are stacked and supported on a substantially spherical support in this order.

Hereinafter, the composite of the present invention will be described in detail for each constituent component.

<Support>

The support used in the present invention is a metal oxide or a carbonaceous support. The metal oxide is not particularly limited. But a metal used for the metal oxide may be a typical metal or a transition metal.

The metal oxide used as a support in the present invention is preferably a basic, neutral or weakly acidic metal oxide. The basic, neutral, or weakly acidic metal oxide means a metal oxide having a surface which exhibits a basic, neutral or weakly acidic property, which is an ability for the surface of a metal oxide to abstract proton ($H^+$) from a reactive substrate, or an ability to give an electron pair to a reactive substrate. For example, a basic metal oxide such as MgO, $CeO_2$, or $ZrO_2$ has a high ability to give an electron pair to a reaction substrate. On the other hand, a metal oxide having a high ability to provide a proton to a reaction substrate or a metal oxide having a high ability to receive an electron pair is called an acidic metal oxide. $Al_2O_3$, $TiO_2$ and the like are weakly acidic metal oxides. A neutral metal oxide, such as $SiO_2$, is in the middle of both, or it has both properties.

The support of the present invention supports a metal amide compound, which will be described later. The treatment is usually carried out in a liquid ammonia. Therefore, from the viewpoint of affinity with ammonia or a metal amide compound to be formed, a basic, neutral, or weakly acidic metal oxide is preferable. There is no particular limitation as long as it is a metal oxide satisfying the above definition. As a specific basic, neutral or weakly acidic metal oxide, it is preferable that at least one metal oxide selected from the group consisting of $ZrO_2$, $TiO_2$, $CeO_2$, $Al_2O_3$, $Nb_2O_5$, $Ta_2O_5$ and MgO is used in a supported metal catalyst, from the viewpoint of reaction rate and specifically, from the viewpoint of a high ammonia synthesis rate when used in an ammonia synthesis catalyst. It is more preferable that at least one metal oxide selected from the group consisting of $ZrO_2$, $TiO_2$, $CeO_2$, $Al_2O_3$, and MgO is used, from the viewpoint of being generally usable and excellent in workability. It is most preferable that $ZrO_2$, $TiO_2$, or $Al_2O_3$ is used, from the viewpoint of cost.

As a support used in the present invention, a carbonaceous support can also be used. The carbonaceous support refers to a support which contains carbon as a main component, such as graphite, carbon black, activated carbon, carbon nanotubes, graphene or the like. Among those, one having no oxygen-containing functional group is preferable in terms of affinity with a metal amide compound. Usually graphite is more preferable. The support may contain one kind or two or more kinds.

As a support used in the present invention, a metal oxide is preferable. This is because of a high reaction activity when it is used in a supported metal catalyst described later. It is presumed that an interaction given by the support is larger than that of the carbonaceous support. This is because when a composite of the present invention having a metal oxide is used as a supported metal catalyst, the stability is higher than that of the carbonaceous support. Furthermore, when the composite of the present invention is used as an ammonia synthesis catalyst, a metal oxide is preferable because the carbonaceous support has the possibility of generating methane by decomposition of the carbonaceous support.

A form of the support in the present invention is not particularly limited and can be changed according to a purpose and use. Usually a powder, a molded body, a porous body, a solid sintered body, a thin film, a solid single crystal or the like can be used. Particularly, a porous molded body is preferable.

The particle size of the support used in the present invention is not particularly limited. A BET specific surface area of the support used in the present invention is not particularly limited. Usually 10 m²/g or more and 1000 m²/g or less, or preferably 500 m²/g or less is used.

The metal oxide and carbonaceous support which have various kinds of powders and molded bodies with different surface areas and pore structures may be used. For example, a support with a large surface area with a developed pore structure may be used. In this case since such basic structure of the support can be maintained, a transition metal and a metal amide compound can be highly dispersed on the support. As a result, a high activity can be obtained.

Also, since a reaction temperature at which a metal amide compound is synthesized is considerably lower than the reaction temperature at which ammonia synthesis is carried out, it is highly possible that shrinkage and aggregation of the metal amide compound occur during the reaction when a transition metal is supported on the metal amide compound. Thereby, the transition metal supported on the metal amide compound may aggregate. When such composite was used as a supported metal catalyst, its activity might decrease. However, by using the composite of the present invention, aggregation of the metal amide compound itself can be prevented, and a stable catalytic activity can be obtained over a long period of time.

<Metal Amide Compound>

A metal amide compound used in the present invention is a metal amide compound represented by the following general formula (1).

$$M(NH_2)_x \quad (1)$$

The M represents a metal atom forming a metal amide compound and is at least one metal atom selected from Li, Na, K, Be, Mg, Ca, Sr, Ba and Eu. Ca, Sr and Ba are preferable from the viewpoint of thermal stability. Ca is more preferable from the viewpoint of reactivity and operability. In addition, x represents the valence of the metal atom M.

The metal amide compound in the present invention is considered to be one of the two-dimensional electride compounds, and when it is supported on a support, the metal amide compound also functions as active specie. It cooperates with transition metal particles supported on the composite to enhance the function as active specie.

The loading amount of the metal amide compound is not particularly limited, and is usually 1% by mass or more, or preferably 10% by mass or more, and usually 90% by mass or less, or preferably 40% by mass or less with respect to the total mass of the metal amide compound and the support. Also, the amount per 1 m² of the BET specific surface area is not particularly limited, and it is usually 0.01 mass % or more, or preferably 0.1 mass % or more, and usually 1.0 mass % or less, and preferably 0.5 mass % or less.

<Transition Metal>

The transition metal used in the present invention is not particularly limited, and usually a metal of Group 4 elements of the periodic table such as Ti, Zr, Hf or the like; a metal of Group 5 elements of the periodic table such as V, Nb or the like; a metal of Group 6 elements of the periodic table such as Cr, Mo, W or the like; a metal of Group 7 elements of the periodic table such as Mn, Tc, Re or the like; a metal of Group 8 elements of the periodic table such as Fe, Ru, Os, or the like; a metal of Group 9 elements of the periodic table such as Co, Rh, Ir or the like; a metal of Group 10 elements of the periodic table such as Ni, Pd, Pt, or the like may be used. These metals can be used alone or in combinations of two or more kinds of metals.

When the composite of the present invention is used as a supported metal catalyst described later, since the transition metal usually becomes a reaction active component, any appropriate specie can be selected according to a reaction using the supported metal catalyst. It is not particularly limited, and preferably, Mo, Mn, Fe, Ru, Rh, Ni, Pt, Pd, Rh or the like may be used.

When the composite of the present invention is used as an ammonia synthesis catalyst described later, the transition metal can be appropriately selected from a conventional metal that can convert a gas containing nitrogen and hydrogen as a raw material to ammonia. It is not particularly limited, and Ru, Co, or Fe is usually used. Ru is preferable from the viewpoint of high reaction activity.

A loading amount of the transition metal is not particularly limited. Usually 0.01% by mass or more, preferably 0.02% by mass or more, or more preferably 0.05% by mass or more is used in term of a mass ratio with respect to total mass (transition metal mass/(support mass+metal amide compound mass+transition metal mass), and usually 30% by mass or less, preferably 20% by mass or less, or more preferably 10% by mass or less is may be used.

<Other Components>

The composite of the present invention may contain a component other than the transition metal, the support and the metal amide compound depending on the intended use thereof.

<Physical Properties of Composite>

A BET specific surface area of the composite of the invention is not particularly limited, and is usually 10 m²/g or more, or preferably 30 m²/g or more, and usually 200 m²/g or less. The average particle size of the transition metal particles supported on the surface of the composite of the present invention is not particularly limited, and is usually several nm to several 10 nm as measured by CO adsorption method. In addition, the transition metal particles are usually supported as nanoparticles having a dispersity of about 10 to 50%.

<Method for Producing Composite>

The composite of the present invention is obtained by firstly supporting a metal amide compound represented by the following general formula (1) on a support used in the present invention to prepare a metal amide-supporting support; and subsequently supporting a transition metal on the metal amide-supporting support.

$$M(NH_2)_x \qquad (1)$$

In the general formula (1), M represents at least one metal atom selected from Li, Na, K, Be, Mg, Ca, Sr, Ba and Eu, and x represents the valence of M.

Hereinafter, the production method of the composite of the present invention will be specifically described. A method of producing the composite of the present invention includes the steps of mixing a support used in the present invention, a metal atom source containing a metal atom M in the general formula (1) (hereinafter sometimes simply referred to as a metal atom source), and liquid ammonia (hereinafter referred to as a mixing step); and reacting the metal atom source and liquid ammonia to yield a metal amide compound on the support to obtain a metal amide-supporting support (hereinafter referred to as a reacting step). FIG. 1 schematically shows a step of supporting $Ca(NH_2)_2$ on a support as an example of the composite of the present invention.

The metal atom source containing the metal atom M is a raw material of the metal atom M in the metal amide compound and is not particularly limited as long as it is a raw material thereof. Usually, a simple substance metal M (hereinafter referred to as metal M) is used. Specifically, it is at least one metal selected from metal Li, metal Na, metal K, metal Be, metal Mg, metal Ca, metal Sr, metal Ba and metal Eu. Hydrides of each metals such as $CaH_2$ can also be used. Preferably, metal M is used in terms of reactivity. As the metal M, metal Li, metal Na, metal K, and metal Ca are preferable, and metal Ca is more preferable in terms of operability and reactivity.

The form of the metal atom source is not particularly limited. But it is preferably powdery or particulate in order to facilitate dissolution in liquid ammonia. Its particle size is not particularly limited and is usually 1 mm or more or preferably 2 mm or more and usually 5 mm or less and preferably 3 mm or less.

The support used in the present invention is not particularly limited before being subjected to the mixing step. It is possible to perform a treatment to remove impurities such as carbon dioxide or surface hydroxyl groups generated by chemical adsorption of water on the surface of the support (hereinafter sometimes referred to as removal treatment). The method of the removal treatment is not particularly limited. It can be carried out by a method usually used. Specifically, a method of heating at a high temperature, a method of vacuum evacuation, or a combination thereof may be used and it is preferable to use a combination of high-temperature heating and vacuum evacuation. Conditions for high-temperature heating are not particularly limited as long as the purpose of the removal treatment is achieved. It can be carried out by a method usually used. It is usually heated at 500° C. or higher. The vacuum evacuation method and a condition are likewise not particularly limited as long as the object of the removal treatment is achieved, and can be carried out by commonly used methods.

A reaction vessel for carrying out the mixing step or the reacting step is not particularly limited. Usually, a pressure vessel is used. The mixing step and the reacting step may be carried out individually or in a consistent manner, but usually both steps are carried out as a consistent process.

In the mixing step, the support, the metal atom source and liquid ammonia are mixed in a reaction vessel. The order of mixing is not particularly limited. Normally, ammonia gas is introduced into a reaction vessel in which the support and the metal atom source are enclosed, and then the reaction vessel is cooled. After ammonia is liquefied, they are mixed. In the mixing step, the metal atom source is usually uniformly dissolved in liquid ammonia. The mixing time is not particularly limited, and it can be appropriately set within a range where the purpose of uniformly dissolving the metal atom source can be achieved. A mixing method is not particularly limited, and for example, stirring or the like may be used. In the case of mixing by stirring, a method is not particularly limited, and it can be carried out by a method usually used.

When cooling the ammonia gas in the reaction solution and liquefying ammonia, a cooling temperature thereof is not particularly limited as long as the ammonia gas is liquefied. Usually the temperature is not lower than the melting point of ammonia (−77° C.) or more, or preferably −50° C. or more, and usually not higher than boiling point (−35° C.) or less, or preferably −40° C. or less under normal pressure. The additional amount of ammonia is not particularly limited. Normally, ammonia having a mass ratio of 3 to 30 times the amount of the metal atom source is used.

In the reacting step, the metal atom source is reacted with liquid ammonia to form a metal amide compound, and the produced metal amide compound is supported on the support. The metal amide compound is produced by a reaction represented by the following reaction formula.

$$M+xNH_3 \rightarrow M(NH_2)_x+(x/2)H_2 \text{ (}x\text{ represents the valence number of the metal M)}$$

The produced metal amide compound $M(NH_2)_x$ is supported on the support which is added in the mixing step, and a metal amide-supporting support is obtained. The reaction temperature is not particularly limited, and usually −20° C. or more and 100° C. or less can be appropriately set according to ease of supporting the metal amide compound on the support. The reaction time is not particularly limited, and can be appropriately set similarly to the reaction temperature.

There is no particular limitation after completion of supporting on the support. Normally, after the temperature of the reaction vessel returns to room temperature, ammonia gas and hydrogen gas remaining in the reaction vessel are discharged from the reaction vessel, whereby a metal amide-supporting support in which a metal amide compound is supported on a support is obtained. The shape of the obtained metal amide-supporting support is not particularly limited. It is usually obtained in a state where the shape of the support used is maintained and its surface is covered with the metal amide compound.

When metal Ca is taken as an example of metal M and it will be described more specifically. FIG. 1 shows an overview of a step of supporting $Ca(NH_2)_2$ on a support. When metal Ca is used as a metal atom source, calcium amide is produced as shown in the following formula.

$$Ca+2NH_3 \rightarrow Ca(NH_2)_2+H_2$$

The outside of a stainless steel pressure vessel filled with the metal Ca and the support is usually cooled in a range of −40 to −50° C. using liquid nitrogen-ethanol. Next, ammonia gas is introduced into the vessel to form liquefied ammonia, and the metal Ca is uniformly dissolved in the liquid ammonia. Stirring is usually carried out for about 1 hour with a magnetic stirrer or the like. Thereafter, the interior of the pressure vessel is kept at −20° C. to 100° C., and a reaction is carried out with stirring usually for about 1 to 3 hours. By this operation, a support having $Ca(NH_2)_2$ immobilized on the support surface is obtained.

A BET specific surface area of the metal amide-supporting support is not particularly limited. It is usually 10 $m^2/g$ or more, or preferably 30 $m^2/g$ or more, and usually 1000 $m^2/g$ or less, and preferably 500 $m^2/g$ or less.

A method for producing the composite of the present invention may include steps of supporting a raw material compound of a transition metal (hereinafter sometimes referred to as a transition metal raw material) on the metal amide-supporting support (hereinafter, a raw material supporting step). Further, it may include a step of thermally decomposing a transition metal raw material to deposit a transition metal. The step of supporting the raw material and the step of depositing the transition metal may be carried out individually or independently or consistently. It is preferable to perform both steps consistently. It is more preferable to carry out a step of depositing a transition metal following the step of supporting the raw material. These steps are preferably carried out subsequent to the mixing step and the reacting step.

The raw material compound of the transition metal is not particularly limited as long as it is a compound capable of making the transition metal used in the composite of the present invention to be supported on the composite. The transition metal salt or the transition metal organometallic complex is usually used. Among them, since the transition metal can be supported on the composite through the step of subsequently depositing the transition metal by thermally decomposing the transition metal raw material, the transition metal raw material is preferably a compound which thermally decomposes easily by heating. For example, the transition metal material is preferably a hydrochloride, a carbonate or an organic acid salt of a transition metal as a transition metal salt, and the transition metal material is also preferably a carbonyl complex, a triphenylphosphine complex, an acetylacetonato complex, metallocene complexes or the like as an organometallic complex.

When the transition metal is Ru, for example, triruthenium dodecacarbonyl $[Ru_3(CO)_{12}]$, dichlorotetrakis (triphenylphosphine) ruthenium $(II)[RuCl_2(PPh_3)_4]$, dichlorotris (triphenylphosphine) ruthenium $(II)[RuCl_2(PPh_3)_3]$, tris (acetylacetonato) ruthenium $(III)[Ru(acac)_3]$, ruthenocene $[Ru(C_5H_5)]$, ruthenium chloride $[RuCl_3]$ or the like may be used.

When the transition metal is Fe, for example, pentacarbonyl iron $[Fe(CO)_5]$, tetracarbonyl iron iodide $[Fe(CO)_4I_2)]$, iron chloride $[FeCl_3]$, ferrocene $[Fe(C_5H_5)_2]$, tris Acetylacetonato) iron $(III)[Fe(acac)_3]$, dodecacarbonyl triiron $[Fe_3(CO)_{12}]$, or the like may be used.

When the transition metal is Co, for example, cobalt chloride $[CoCl_3]$, tris (acetylacetonato) cobalt (III) $[Co(acac)_3]$, cobalt (II) acetylacetonato $[Co(acac)_2]$, cobalt octacarbonyl $[Co_2(CO)_8]$, cobaltocene $[Co(C_5H_5)_2]$, or the like may be used.

Among the transition metal raw materials, a carbonyl complex of a transition metal is more preferable from the viewpoint of easy thermal decomposition and easy handling. The metal amide compound may change its surface when the metal amide compound is immersed in a solvent such as alcohol. However, when using the carbonyl compound as a metal source, since a transition metal can be supported by vapor deposition without using a solvent, the transition metal source can be supported while keeping the surface structure. Exemplary carbonyl compounds other than the above include triosmium dodecacarbonyl $[Os_3(CO)_{12}]$, molybdenum hexacarbonyl $[Mo(CO)_6]$ or the like.

In the step of supporting raw material, a method of supporting the transition metal raw material on the metal amide-supporting support is not particularly limited. An impregnation method, a physical mixing method, a vapor phase deposition method such as an evaporation deposition, or the like may be used.

In the raw material supporting step, usually, firstly the metal amide-supporting support and the transition metal raw material are mixed. A specific mixing method is not particularly limited. An impregnation method or a physical mixing method may be used and when both the metal amide-supporting support and the transition metal raw material are solid, it is preferable to use the physical mixing method. When a solid sintered body, a thin film, a solid single crystal, or the like is used as a support, it is possible to use an impregnation mixing method as the same manner as a powder or a porous body, or it is also possible to use a method of mixing the transition metal raw material on the surface thereof by a vapor phase deposition method such as a CVD method (chemical vapor deposition method) or a sputtering method.

As the physical mixing method, a commonly used method, so-called solid phase mixing method, can be carried out by using, for example, a mortar, a ball mill or the like. As the impregnation mixing method, specifically, for example, a method of dispersing the metal amide-supporting support in a solution in which the transition metal raw material is dissolved in a solvent and stirring it may be used. The solvent for dissolving the transition metal raw material is not particularly limited as long as it can uniformly dissolve the transition metal raw material. Usually a solvent such as n-hexane, benzene, toluene, THF, ethanol, liquid ammonia, dimethylformamide or the like may be used.

The ratio of the transition metal raw material and the metal amide-supporting support in the raw material supporting step is not particularly limited. The ratio of the transition metal material is usually 0.01% by mass or more, preferably 0.02% by mass or more, or more preferably 0.05% by mass or more, and usually 40% by mass or less, preferably 30% by mass, or less more preferably 20% by mass or less with respect to the metal amide-supporting support.

The metal amide-supporting support on which the transition metal raw material is supported can deposit the transition metal by thermal decomposition. The method of thermal decomposition is not particularly limited, and a generally performed method can be used. Usually the thermal decomposition is carried out in an inert gas stream such as nitrogen, argon, helium; or under vacuum. The metal amide-supporting support supporting the transition metal raw material firstly evaporates the solvent by heating and solidifies. Subsequently, by heating it continuously, the transition metal raw material is reduced and the transition metal is deposited. Thereby, the composite of the present invention is obtained. The temperature during thermal decomposition is not particularly limited. It is usually 50° C. or more and 200° C. or less. The time of thermal decomposition is not particularly limited, and is usually 30 minutes or more and 5 hours or less.

<Supported Metal Catalyst/Ammonia Synthesis Catalyst>

A supported metal catalyst containing the composite of the present invention can be used as a catalyst for various chemical reactions. Specifically, the composite itself of the present invention can be used as a supported metal catalyst, or the composite of the present invention can be used in a supported metal catalyst containing the composite as a reactive active component and a component other than the composite.

A BET specific surface area of the supported metal catalyst is not particularly limited. It is usually 10 m²/g or more, or preferably 30 m²/g or more, and usually 1000 m²/g or less, or preferably 500 m²/g or less. The BET specific surface area is the same when it is used as an ammonia synthesis catalyst.

The supported metal catalyst containing the composite of the present invention can be used as a molded body by using a conventional molding technique. Specific examples include shapes such as granular, spherical, tablet, ring, macaroni, four leaves, dice, honeycomb, or the like. The composite of the present invention can also be used as a supported metal catalyst obtained by coating the composite on a support which is usually used.

The supported metal catalyst containing the composite of the present invention can be used as a catalyst in various reactions. Specifically, it can be used for hydrogenation of unsaturated bonds such as olefins, acetylenes, aromatic rings, aldehyde groups, α, β unsaturated aldehydes; hydrocracking of hydrocarbons; hydrogen transfer reaction, or the like. In this case, the transition metal to be supported is not particularly limited. Usually Ni, Pd, Pt, Rh, or the like are used. It can also be used as a catalyst for ammonia decomposition reaction. In this case, the transition metal to be supported is not particularly limited. Usually, Ru, Fe, Co, Ni, Mo, Mn, Rh or the like may be used, and Ru is preferable.

The supported metal catalyst containing the composite of the present invention is suitable for the ammonia synthesis reaction. That is, regarding the composite of the present invention, the composite itself can be used as an ammonia synthesis catalyst, or it can be used in an ammonia synthesis catalyst containing the composite as a reaction active component and components other than the composite. Specifically, ammonia can be produced by bringing a gas containing nitrogen and hydrogen as a raw material into contact with the composite of the present invention.

Regarding the composite of the present invention, it is presumed that a metal amide compound which is supported on a support in the composite also functions as an active species and enhances the function as an active species in cooperation with transition metal particles supported on the composite. It is also presumed that the support further enhances the function as active species by acting to increase the active component, and therefore it is suitable that the composite is used as a supported metal catalyst. Specifically, when the composite of the present invention is used as an ammonia synthesis catalyst, it is considered that the catalyst exhibits higher catalytic activity than a conventional catalyst using a two-dimensional electride compound as a support and that a more stable catalytic activity can be obtained for a long time. It is suitable as an ammonia synthesis catalyst.

In addition, the supported metal catalyst containing the composite of the present invention can be used for ammonia decomposition reaction. The ammonia decomposition reaction is a reaction of decomposing ammonia into nitrogen and hydrogen, and the reaction can be carried out by using a usual method.

<Synthesis of Ammonia>

The ammonia synthesis method of the present invention is characterized in that a gas containing nitrogen and gas containing hydrogen are brought into contact with an ammonia synthesis catalyst containing the composite of the present invention to synthesize ammonia (hereinafter simply referred to as the ammonia synthesis catalyst of the present invention). The reaction form is not particularly limited as long as it satisfies the above characteristics, and a usual method can be used. Hereinafter, as a typical form of the reaction, a method similar to the conventional Haber-Bosch method is described as an example. The method includes steps of reacting a mixing gas of nitrogen and hydrogen directly under heating and pressure, producing ammonia by a reaction of $N_2+3H_2\rightarrow 2NH_3$, and then separating ammonia by cooling or absorbing ammonia with water.

The nitrogen gas and the hydrogen gas are supplied so as to be in contact with the ammonia synthesis catalyst of the present invention installed in the reactor. It is not particularly limited, and t is preferable to carry out a pretreatment to the ammonia synthesis catalyst, and in the pretreatment reduction treatment is performed with hydrogen gas or a mixed gas of hydrogen and nitrogen to reduce and remove oxides and the like adhering to the surface of the ammonia synthesis catalyst. This is because the composite of the present invention contained in the ammonia synthesis catalyst adsorbs water preferentially in the atmosphere and in some cases decomposition of the compound itself proceeds under excessive moisture.

Similarly, it is preferable that the ammonia synthesis reaction is carried out in an atmosphere which contains moisture content as low as possible, that is, the moisture content is low. The ammonia synthesis reaction is not particularly limited, but it is preferable that the moisture in the nitrogen gas and in the hydrogen gas is small, and it is usually preferable that the moister content is 100 ppm or less or 50 ppm or less.

Next, ammonia is synthesized by heating the ammonia synthesis catalyst of the present invention in a mixed gas atmosphere of nitrogen and hydrogen as raw materials. The molar ratio of nitrogen and hydrogen is not particularly limited. It is usually preferable to perform the process at a volume ratio of nitrogen/hydrogen=1/10 or more, preferably 1/5 or more, and usually 1/1 or less. The reaction temperature is not particularly limited. It is usually conducted at 100° C. or more, preferably 200° C. or more, more preferably 250° C. or more, usually 600° C. or less, preferably 500° C. or less. Normally, the lower the reaction temperature, the more advantageous the equilibrium is for synthesis of ammonia. However, the above temperature range is preferable because it is a temperature range that obtains sufficient ammonia synthesis rate and at the same time equilibrium favor ammonia production.

The reaction pressure of the mixed gas of nitrogen and hydrogen is not particularly limited. It is usually 10 kPa or more, preferably 100 kPa or more, and usually 20 MPa or less, preferably 10 MPa or less, more preferably 1 MPa or less. In the ammonia synthesis reaction, the reaction efficiency is higher when reacting under pressurized conditions, so in view of practical application, the reaction pressure is preferably higher. On the other hand, when the reaction pressure is high, special high pressure reaction equipment is required. The ammonia synthesis catalyst of the present invention is advantageous in that it can sufficiently synthesize ammonia even under low pressure. Among the nitrogen and hydrogen gas used for the reaction, unreacted nitrogen and hydrogen gas can be recycled to the reactor after removal of the formed ammonia.

The reaction system is not particularly limited. Examples of types of the synthesis reaction include a hatch type reaction, a closed circulation type reaction, and a flow type reaction system. The flow type reaction system is most preferably used from a practical point of view. In addition, since the ammonia synthesis reaction is exothermic reaction, it is favorable that the reaction be performed while removing the reaction heat and thus usual method are used to industrially increase the yield. For example, in a case of using a flow type reaction system, a method of obtaining a high yield of ammonia has been proposed, and the method has been proposed wherein a plurality of reactors with which the catalyst is filled are connected to each other in a row, an intercooler is installed at an outlet of each of the reactors so as to remove the heat, and thus an inlet temperature of each of the reactor is decreased, thereby increasing the yield of ammonia. Further, a method of accurately controlling an outlet temperature of each of the reaction layers may be used, and the method is performed by using a reactor including a plurality of catalyst layers in the inside thereof.

In the ammonia synthesis method of present invention, similar to the conventional method which has been performed, it is possible to perform the ammonia synthesis by using one reactor or a plurality of reactors with which the catalyst is filled. As a catalyst to be used, the ammonia synthesis catalyst of the present invention can be used alone, a combination of two or more types of the catalyst selected from the ammonia synthesis catalysts of the present invention can be used, or a combination of the catalyst of the present invention and the well-known catalyst can be used. In addition, either of the method of connecting the plurality of reactors to each other, or the reactor having the plurality of reaction layers in the same reactor can be used.

In the present invention, in a case where the ammonia synthesis catalysts are used in combination, the activity of the catalyst of the present invention is high at the low temperature, and thus the catalyst is preferably used in the last reactor. That is, it is possible to obtain a high yield of ammonia by performing the last reaction at the low temperature which is in favor of the equilibrium.

Under the equilibrium reaction conditions for industrial ammonia synthesis, due to the equilibrium limitation, the concentration of ammonia in the reaction gas at the outlet of the reactor is equal to or less than 20% by volume. Accordingly, after the ammonia produced in the reaction gas is cooled and removed, unreacted raw material can be recycled and used as the raw material after a portion of the impurities included in the reaction gas or the unreacted raw material is separated by membrane separation or the like and purged from the system.

As a hydrogen raw material used for the method of synthesizing ammonia, it is possible to use hydrogen raw materials which can be produced through various production methods shown below. Production methods, wherein coal, petroleum or natural gas is used as a raw material, an autothermal reforming method which is obtained by combining the steam reforming and the partial oxidation, and methods wherein these methods are combined with a shift reaction, and production methods such as a method of using biomass as a raw material, a method performed by water electrolysis, and a method of water decomposition performed by an optical catalyst can be used to generated the hydrogen.

In a case where the natural gas raw material is used as the raw material of the method of synthesizing ammonia, the hydrogen gas and the nitrogen gas are produced through the steps which include a steam reforming step of the natural gas, a partial oxidation reforming step, a CO shift reacting step, a $CO_2$ removing step, and a subsequent CO removing step performed by continuous CO methanation. Since the steam reforming reaction is endothermic, the reaction heat which is generated in the auto-thermal reaction is used, and the H/N molar ratio in a case where air is used as the nitrogen gas raw material is in a range of approximately 1.7 to 2.5. The unreacted gas of the steaming reforming method contains the hydrogen gas, and thus is preferably used as a recycle gas by circulating in the reforming step. Methods of efficiently performing a reaction by controlling the ratio of the fresh gas to the recycle gas have been developed, and in the present invention, the above-described method can be also used.

On the other hand, as a method of obtaining a raw material having the high H/N ratio, a method of using oxygen-enriched air has been developed. When such a raw material is used, an amount of recycled gas is decreased, and thus the aforementioned method is energetically preferred. Furthermore, a method in which, after compressing and separating of the air is performed, oxygen is used to produce hydrogen through an auto-thermal method and nitrogen is used for the reaction gas or process nitrogen is a method which is preferable in terms of the energy saving. Either method can be used as the method of producing the raw material for the present invention.

EXAMPLE

Hereinafter, the present invention will be described in more detail with respect to examples.

(BET Specific Surface Area Analysis)

In the following Examples and Comparative Examples, a measurement of the BET specific surface area was carried out by adsorbing nitrogen gas at the liquid nitrogen temperature on surface of an object and measuring the amount of nitrogen monolayer adsorbed. The analysis conditions are as follows.

Measurement Condition

Apparatus: BELSORP-mini II manufactured by Microtrac Bell Inc.

Adsorbed gas: nitrogen (99.99995%)

Adsorption temperature: liquid nitrogen temperature (−196° C.)

(Dispersity Measurement)

CO molecule is adsorbed on the surface of an object, a number of metal atoms exposed to the surface is estimated from the adsorbed CO molecular weight, and the metal dispersity can be obtained by dividing the total metal atom amount. Specifically, it can be obtained by the following formula. The analysis conditions are as follows.

(Metal dispersity)=(number of metal atoms exposed on the surface)/(the number of all metal atoms supported)×100(%)(The number of metal atoms was estimated with CO/Ru=1)

Measurement Condition

Apparatus: BELCAT-A manufactured by Microtrac Bell Co.

Adsorbed gas: CO—He mixed gas (CO: 9.5%)

Adsorption temperature: 50° C.

Support gas: He

Detection of CO: TCD (Activation Energy Measurement)

Activation energy refers to the energy required to excite the starting material of the reaction from the ground state to the transition state. The smaller the energy is, the easier the reaction is. The temperature dependence of the reaction rate is measured and calculated from the slope when plotting the natural logarithm of reaction rates with respect to the reciprocal of the temperature.

The evaluation of the composite of the present invention as an ammonia synthesis catalyst is carried out by evaluating the ammonia synthesis activity based on its synthesis rate which was determined by quantitating the amount of $NH_3$ produced using the ammonia synthesis catalyst of the present invention by using a gas chromatograph or using a ion chromatograph when dissolving formed $NH_3$ in an aqueous sulfuric acid solution.

(Gas Chromatograph (GC) Analysis)

Ammonia production amounts in the following Examples and Comparative Examples were determined by gas chromatograph (GC) analysis using an absolute calibration curve method. The analysis conditions are as follows.

Measurement Condition

Apparatus: GC-14A manufactured by Shimadzu Corporation

Column: Porapak Q 4 1000 mm manufactured by GL Sciences Inc.

Support gas: He gas

Column temperature: 80° C.

(Ion Chromatographic Analysis)

Ammonia production amounts in the following Examples and Comparative Examples were determined by dissolving the produced ammonia gas in a 0.05 M sulfuric acid aqueous solution and determining the dissolved solution by ion chromatographic analysis using an absolute calibration curve method. The analysis conditions are as follows.

Measurement Condition

Apparatus: HPLC Prominence manufactured by Shimadzu Corporation

Column: Shim-pack IC-C4 Length: 150 mm, inner diameter 4.6 mm manufactured by Shimadzu Corporation Eluent: A mixed aqueous solution of oxalic acid (3 mM), 18-crown-6-ether (2.0 mM)

Column temperature: 40° C.

Flow rate: 1.0 mL/min

Example 1

<Synthesis of Ru-supporting $Ca(NH_2)_2/ZrO_2$>

As a support, 0.7 g of $ZrO_2$ powder (SZ31164, NorPro, manufactured by Saint-Gobain) having a specific surface area of 100 $m^2$/g was dehydrated by being evacuated for 5 hours in a quartz glass vessel at 500° C. In a glove box under an Ar atmosphere, dehydrated $ZrO_2$ powder and 0.243 g of metal Ca powder were placed in a 30 ml pressure vessel made of stainless steel. The additional amount of metal Ca was set so that the loading amount of $Ca(NH_2)_2$ was 40% by mass with respect to the total amount of $Ca(NH_2)_2$ and $ZrO_2$.

After removing the sealed stainless steel pressure vessel from the glove box, ammonia gas was introduced into the pressure vessel while being cooled to about −50° C., and liquid ammonia was charged. The liquid in the pressure vessel was stirred with a magnetic stirrer for 1 hour; the pressure vessel was subsequently immersed in an oil bath and heated at an oil bath at temperature of 100° C. for 2 hours for reaction. Thereafter, the pressure vessel was cooled to room temperature, and the ammonia gas remaining in the container was discharged from the pressure vessel. Powder of $ZrO_2$ on which calcium amide was supported (hereinafter referred to as $Ca(NH_2)_2/ZrO_2$) in the pressure vessel was recovered in a glove box under Ar atmosphere.

The obtained powder of $Ca(NH_2)_2/ZrO_2$ was about 1 g, and the BET specific surface area was measured by the nitrogen adsorption method (NOVA 4200e, manufactured by Quantachrome) was 60 $m^2$/g.

Next, the $Ca(NH_2)_2/ZrO_2$ powder and $Ru_3(CO)_{12}$ powder were agitated in an agate mortar so as to make Ru loading amount to 5 mass % with respect to the total amount of Ru and $Ca(NH_2)_2/ZrO_2$ by the physical mixing method, and the mixed powder was sealed in a vacuum quartz glass tube. The quartz glass tube in which the mixed powder was sealed was heated to 250° C. and reacted for 15 hours to obtain a powder of the composite in which metal Ru was supported on $Ca(NH_2)_2/ZrO_2$ (hereinafter sometimes referred to as $Ru/Ca(NH_2)_2/ZrO_2$).

Figure 2:
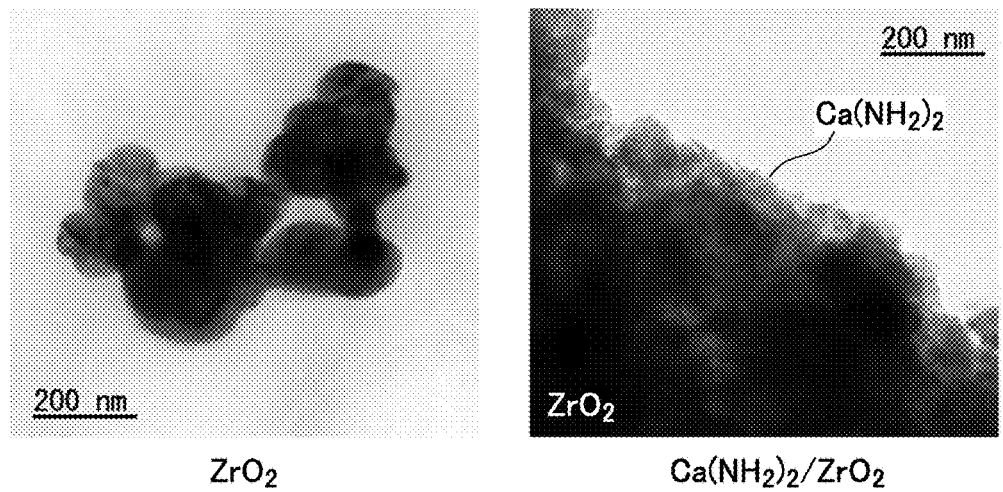
FIG. 2 is a TEM photograph of a composite of $Ca(NH_2)_2/ZrO_2$ in which $Ca(NH_2)_2$ is supported on a $ZrO_2$ support.

FIG. 2 shows a TEM image of the obtained powder of this composite. Although the surface of $ZrO_2$ is smooth, it can be confirmed that the powder of the obtained composite is in a state where $Ca(NH_2)_2$ is coated on the surface. The BET surface area of this composite measured by nitrogen adsorption method was 64 $m^2$/g. The Ru dispersity measured by the CO adsorption method was 27.6%, and the Ru average particle diameter measured by the CO adsorption method was 4.8 nm.

<Ammonia Synthesis Reaction>

A reaction of reacting nitrogen gas ($N_2$) with hydrogen gas ($H_2$) to produce ammonia gas ($NH_3$) was carried out. As an ammonia synthesis catalyst, 0.1 g of the obtained composite powder was packed in a glass tube and the reaction was carried out in a fixed bed flow reactor. The flow rate of gas was set to $N_2$:15 mL/min and $H_2$:45 mL/mi, so that the total flow rate is 60 mL/min under atmospheric pressure and at reaction temperature of 340° C.

Figure 3:
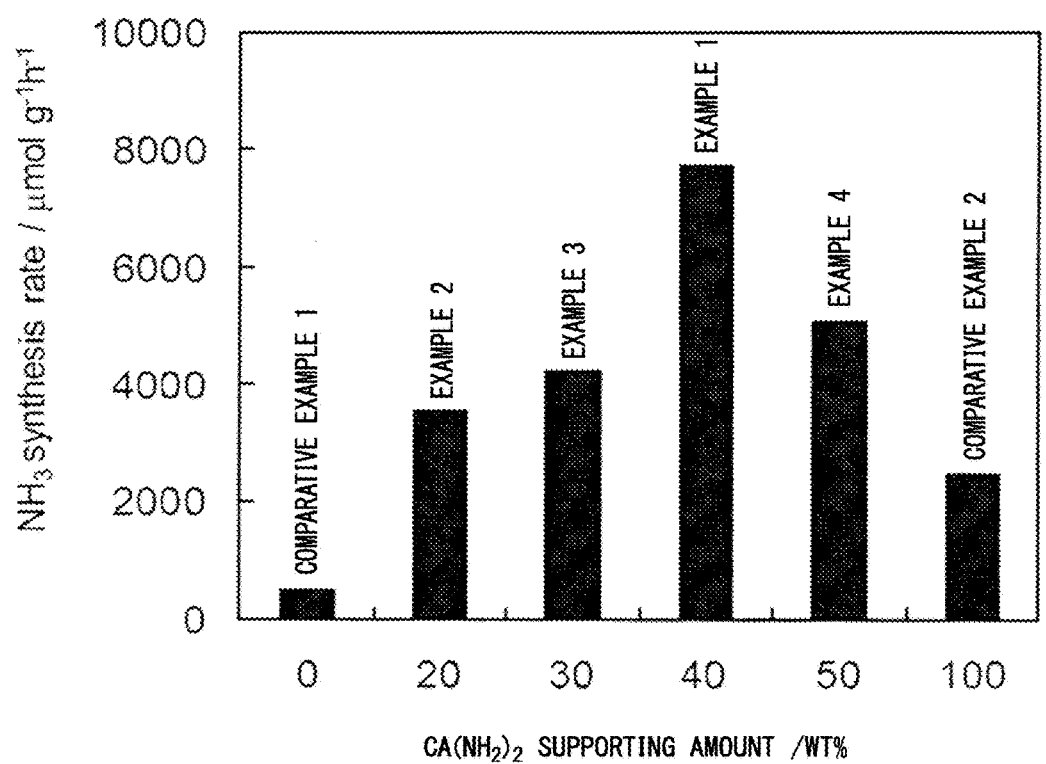
FIG. 3 is a graph showing catalytic activities when a composite in which different loading amounts of $Ca(NH_2)_2$ are supported on a $ZrO_2$ support and Ru is further supported was used as an ammonia synthesis catalyst.

The effluent gas of the reactor of the flow system was bubbled into a 0.005 M sulfuric acid aqueous solution, and the produced ammonia was dissolved in the solution. And then, the resultant ammonium ion was quantitated by ion chromatography. As shown in FIG. 3, the synthesis rate of ammonia at 340° C. was 7383 μmol/g·h. TOF was 16.7× $10^{-3}$/s. The activation energy at 340° C. to 250° C. was 65 kJ/mol.

Example 2

The composite $Ru/Ca(NH_2)_2/ZrO_2$ was prepared in the same manner as in Example 1 except that the loading amount of $Ca(NH_2)_2$ in Example 1 was set to 20% by mass and the added amount of metal Ca was changed to 0.118 g. The specific surface area of the obtained metal amide-supporting support $Ca(NH_2)_2/ZrO_2$ was 105 $m^2$/g. The specific surface area of the resulting composite $Ru/Ca(NH_2)_2/ZrO_2$ powder was 81 $m^2$/g. Using the obtained composite as an ammonia synthesis catalyst, an ammonia synthesis reaction was carried out in the same manner as in Example 1. The synthesis rate of ammonia at 340° C. was 3559 μmol/g·h.

Example 3

$Ru/Ca(NH_2)_2/ZrO_2$ was synthesized in the same manner as in Example 1 except that the loading amount of $Ca(NH_2)_2$ in Example 1 was set to 30% by mass and the amount of metal Ca added was changed to 0.177 g. The specific surface area of the obtained $Ca(NH_2)_2/ZrO_2$ was 92.2 $m^2$/g. The specific surface area of the resulting composite $Ru/Ca(NH_2)_2/ZrO_2$ powder was 72 $m^2$/g. Using the obtained composite as an ammonia synthesis catalyst, an ammonia synthesis reaction was carried out in the same manner as in Example 1. The synthesis rate of ammonia at 340° C. was 4229 μmol/g·h.

Example 4

A composite $Ru/Ca(NH_2)_2/ZrO_2$ was prepared in the same manner as in Example 1 except that the loading amount of Ca(NH$_2$)$_2$ in Example 1 was set to 50% by mass and the amount of metal Ca added was changed to 0.295 g. The specific surface area of Ca(NH$_2$)$_2$/ZrO$_2$ obtained was 55 m$^2$/g. The specific surface area of the resulting composite Ru/Ca(NH$_2$)$_2$/ZrO$_2$ was 42 m$^2$/g. Using the obtained composite as an ammonia synthesis catalyst, an ammonia synthesis reaction was carried out in the same manner as in Example 1. The synthesis rate of ammonia at 340° C. was 5082 μmol/g·h.

Example 5

A composite Ru/Ca(NH$_2$)$_2$/ZrO$_2$ was synthesized in the same manner as in Example 1 except that the loading amount of Ru in Example 1 was changed to 2% by mass. Using the obtained composite as an ammonia synthesis catalyst, an ammonia synthesis reaction was carried out in the same manner as in Example 1. The synthesis rate of ammonia at 340° C. was 2930 μmol/g·h.

Example 6

The composite Ru/Ca(NH$_2$)$_2$/ZrO$_2$ was synthesized in the same manner as in Example 1 except that the loading amount of Ru in Example 1 was changed to 8% by mass. Using the obtained composite as an ammonia synthesis catalyst, an ammonia synthesis reaction was carried out in the same manner as in Example 1. The synthesis rate of ammonia at 340° C. was 7420 μmol/g·h.

TABLE 1

|  |  | Ru-loading amount (mass %) | Ca(NH$_2$)$_2$-loading amount (mass %) | NH$_3$ synthesis rate (μmol/g · h) |
|---|---|---|---|---|
| Example 1 | Ru/Ca(NH$_2$)$_2$/ZrO$_2$ | 5 | 40 | 7388 |
| Example 2 | Ru/Ca(NH$_2$)$_2$/ZrO$_2$ | 5 | 20 | 3559 |
| Example 3 | Ru/Ca(NH$_2$)$_2$/ZrO$_2$ | 5 | 30 | 4229 |
| Example 4 | Ru/Ca(NH$_2$)$_2$/ZrO$_2$ | 5 | 50 | 5092 |
| Example 5 | Ru/Ca(NH$_2$)$_2$/ZrO$_2$ | 2 | 40 | 2930 |
| Example 6 | Ru/Ca(NH$_2$)$_2$/ZrO$_2$ | 8 | 40 | 7420 |
| Comparative Example 1 | Ru/ZrO$_2$ | 5 | — | 506 |
| Comparative Example 2 | Ru/Ca(NH$_2$)$_2$ | 5 | 40 | 2481 |

* Reaction temperature: 340° C., Reaction flow rate: 60 ml/min, Reaction pressure 0.1 MPa, N$_2$:H$_2$ = 1:3 (molar ratio).

Example 7

CeO$_2$ on which calcium amide was supported (hereinafter referred to as Ca(NH$_2$)$_2$/CeO$_2$) was obtained in the same manner as in Example 1 except that CeO$_2$ (specific surface area: 81.4 m$^2$/g, JRC-CEO-3) was used as a support. The specific surface area of Ca(NH$_2$)$_2$/CeO$_2$ was 109 m$^2$/g.
A composite powder was obtained by supported metal Ru on Ca(NH$_2$)$_2$/CeO$_2$ (hereinafter referred to as Ru/Ca(NH$_2$)$_2$/CeO$_2$) by the same method as in Example 1. The specific surface area of Ru/Ca(NH$_2$)$_2$/CeO$_2$ was 76 m$^2$/g. The Ru dispersity of Ru/Ca(NH$_2$)$_2$/CeO$_2$ was 20.5%, and the Ru average particle diameter was 18.3 nm.
Ammonia synthesis reaction was carried out in the same manner as in Example 1 except that the composite used as the ammonia synthesis catalyst was Ru/Ca(NH$_2$)$_2$/CeO$_2$. The synthesis rate of ammonia at 340° C. was 5255 μmol/g·h. The TOF was 15.2×10$^{-3}$ s$^{-1}$. The activation energy at 340° C. to 250° C. was 59 kJ/mol.

TABLE 2

|  |  | Ru-loading amount (mass %) | Ca(NH$_2$)$_2$-loading amount (mass %) | NH$_3$ synthesis rate (μmol/g · h) |
|---|---|---|---|---|
| Example 1 | Ru/Ca(NH$_2$)$_2$/ZrO$_2$ | 5 | 40 | 7388 |
| Example 7 | Ru/Ca(NH$_2$)$_2$/CeO$_2$ | 5 | 40 | 5255 |
| Example 8 | Ru/Ca(NH$_2$)$_2$/TiO$_2$ | 5 | 40 | 5557 |
| Example 9 | Ru/Ca(NH$_2$)$_2$/MgO | 5 | 40 | 6904 |
| Example 10 | Ru/Ca(NH$_2$)$_2$/Ta$_2$O$_5$ | 5 | 40 | 6370 |
| Example 11 | Ru/Ca(NH$_2$)$_2$/Nb$_2$O$_5$ | 5 | 40 | 4995 |
| Example 12 | Ru/Ca(NH$_2$)$_2$/Al$_2$O$_3$ | 5 | 40 | 5094 |
| Example 13 | Ru/Ca(NH$_2$)$_2$/Gra | 5 | 40 | 2909 |
| Comparative Example 1 | Ru/ZrO$_2$ | 5 | — | 506 |
| Comparative Example 2 | Ru/Ca(NH$_2$)$_2$ | 5 | 40 | 2481 |
| Comparative Example 3 | Ru/Ca(NH$_2$)$_2$/SnO$_2$ | 5 | 40 | 182 |
| Comparative Example 4 | Ru/C12A7:e$^-$ | 2 | — | 2221 |
| Comparative Example 5 | Ru/Ca$_3$N$_2$ | 2 | — | 3164 |
| Comparative Example 6 | Ru—Cs/MgO | 6 | — | 4303 |

* Reaction temperature: 340° C., Reaction flow rate: 60 mL/min, Reaction pressure: 0.1 MPa, N$_2$:H$_2$ = 1:3 (molar ratio)

Example 8

TiO$_2$ on which a calcium amide was supported (hereinafter referred to as Ca(NH$_2$)$_2$/TiO$_2$) was obtained in the same manner as in Example 1 except that TiO$_2$ (specific surface area 50 m$^2$/g, P-25 manufactured by degussa) was used as a support. A specific surface area of Ca(NH$_2$)$_2$/TiO$_2$ was 105 m$^2$/g. A composite powder was obtained by supporting metal Ru on Ca(NH$_2$)$_2$/TiO$_2$ (hereinafter referred to as Ru/Ca(NH$_2$)$_2$/TiO$_2$) in the same manner as in Example 1. The specific surface area of Ru/Ca(NH$_2$)$_2$/TiO$_2$ was 71 m$^2$/g. A Ru dispersity of this composite was 21.6%. The Ru average particle diameter was 6.2 nm.
An ammonia synthesis reaction was carried out in the same manner as in Example 1 except that the composite used as the ammonia synthesis catalyst was Ru/Ca(NH$_2$)$_2$/TiO$_2$. A synthesis rate of ammonia at 340° C. was 5557 μmol/g h. TOF was 14.4×10$^{-3}$ s$^{-1}$. The activation energy at 340° C. to 250° C. was 61 kJ/mol.

Example 9

MgO on which calcium amide was supported (hereinafter referred to as Ca(NH$_2$)$_2$/MgO) was obtained in the same manner as in Example 1 except that MgO (specific surface area 30 m$^2$/g, 500 A manufactured by Ube Industries, Ltd.) was used as a support. A specific surface area of Ca(NH$_2$)$_2$/MgO was 91 m$^2$/g. A composite powder was obtained by supporting Metal Ru on Ca(NH$_2$)$_2$/MgO (hereinafter referred to as Ru/Ca(NH$_2$)$_2$/MgO) in the same manner as in Example 1. A specific surface area of Ru/Ca(NH$_2$)$_2$/MgO was 44 m$^2$/g. A Ru dispersity of this composite was 28.6%. A Ru average particle diameter was 4.6 nm.
A ammonia synthesis reaction was carried out in the same manner as in Example 1 except that the composite used as the ammonia synthesis catalyst was Ru/Ca(NH$_2$)$_2$/MgO. The synthesis rate of ammonia at 340° C. was 6904 μmol/g·h. TOF was 13.8×10$^{-3}$ s$^{-1}$. The activation energy at 340° C. to 250° C. was 67 kJ/mol.

Example 10

Ta$_2$O$_5$ on which calcium amide was supported (hereinafter referred to as Ca(NH$_2$)$_2$/Ta$_2$O$_5$) was obtained in the same manner as in Example 1 except that Ta$_2$O$_5$ (specific surface area 20 m$^2$/g) was used as a support. A composite powder was obtained by supporting Metal Ru on Ca(NH$_2$)$_2$/Ta$_2$O$_5$ (hereinafter referred to as Ru/Ca(NH$_2$)$_2$/Ta$_2$O$_5$) in the same manner as in Example 1. The specific surface area of Ru/Ca(NH$_2$)$_2$/Ta$_2$Os was 18 m$^2$/g.

Ammonia synthesis reaction was carried out in the same manner as in Example 1 except that the composite used as the ammonia synthesis catalyst was Ru/Ca(NH$_2$)$_2$/Ta$_2$O$_5$. The synthesis rate of ammonia at 340° C. was 6370 µmolg$^{-1}$ h$^{-1}$.

Example 11

Nb$_2$O$_5$ on which calcium amide was supported (hereinafter referred to as Ca(NH$_2$)$_2$/Nb$_2$O$_5$) was obtained in the same manner as in Example 1 except that a Nb$_2$O$_5$ support (Specific surface area 50 m$^2$/g) was used as a support. A composite powder was obtained by supporting metal Ru on Ca(NH$_2$)$_2$/Nb$_2$O$_5$ (hereinafter referred to as Ru/Ca(NH$_2$)$_2$/Nb$_2$O$_5$) in the same manner as in Example 1. The specific surface area of Ru/Ca(NH$_2$)$_2$/Nb$_2$O$_5$ was 60 m$^2$/g.

Ammonia synthesis reaction was carried out in the same manner as in Example 1 except that the composite used as the ammonia synthesis catalyst was Ru/Ca(NH$_2$)$_2$/Nb$_2$O$_5$. The synthesis rate of ammonia at 340° C. was 4995 µmolg$^{-1}$ h$^{-1}$.

Example 12

Al$_2$O$_3$ on which calcium amide was supported (hereinafter referred to as Ca(NH$_2$)$_2$/Al$_2$O$_3$) was obtained in the same manner as in Example 1 except that Al$_2$O$_3$ (specific surface area: 80 m$^2$/g, manufactured by Alfa Aesar) was used as a support. The specific surface area of Ca(NH$_2$)$_2$/Al$_2$O$_3$ was 50 m$^2$/g. A composite powder was obtained by supporting metal Ru on Ca(NH$_2$)$_2$/Al$_2$O$_3$ (hereinafter referred to as Ru/Ca(NH$_2$)$_2$/Al$_2$O$_3$) in the same manner as in Example 1. The specific surface area of Ru/Ca(NH$_2$)$_2$/Al$_2$O$_3$ was 35 m$^2$/g.

Ammonia synthesis reaction was carried out in the same manner as in Example 1 except that the composite used as the ammonia synthesis catalyst was Ru/Ca(NH$_2$)$_2$/A$_2$O$_3$. The synthesis rate of ammonia at 340° C. was 5094 µmolg$^{-1}$ h$^{-1}$.

Example 13

Graphite on which calcium amide was supported (hereinafter referred to as Ca(NH$_2$)$_2$/Gra) was obtained in the same manner as in Example 1 except that graphite (HSAG) (specific surface area: 300 m$^2$/g) was used as a support. A composite powder was obtained by supporting metal Ru on Ca(NH$_2$)$_2$/Gra (hereinafter referred to as Ru/Ca(NH$_2$)$_2$/Gra) in the same manner as in Example 1. The specific surface area of Ru/Ca(NH$_2$)$_2$/Gra was 250 m$^2$/g.

Ammonia synthesis reaction was carried out in the same manner as in Example 1 except that the composite used as the ammonia synthesis catalyst was Ru/Ca(NH$_2$)$_2$/Gra. The synthesis rate of ammonia at 340° C. was 2909 µmolg$^{-1}$ h$^{-1}$.

Comparative Example 1

A powder of ZrO$_2$ on which metal Ru was supported (hereinafter referred to as Ru/ZrO$_2$) was obtained in the same manner as in Example 1 except that Ca(NH$_2$)$_2$ was not supported on the support ZrO$_2$.

Ammonia synthesis reaction was carried out in the same manner as in Example 1 except that Ru/ZrO$_2$ was used as an ammonia synthesis catalyst. The synthesis rate of ammonia at 340° C. was 506 µmol/g·h as shown in FIG. 3.

Comparative Example 2

0.236 g of metal Ca powder was placed in the stainless steel pressure vessel in Example 1, and the same operation as in Example 1 was performed to obtain Ca(NH$_2$)$_2$ powder. A powder of Ca(NH$_2$)$_2$ on which metal Ru was supported (hereinafter referred to as Ru/Ca(NH$_2$)$_2$) was obtained in the same manner as in Example 1.

An ammonia synthesis reaction was carried out in the same manner as in Example 1 except that Ru/Ca(NH$_2$)$_2$ was used as an ammonia synthesis catalyst. The synthesis rate of ammonia at 340° C. was 2481 µmol/g·h as shown in FIG. 3. The specific surface area of the metal amide powder represented by Ca(NH$_2$)$_2$ was 127 m$^2$/g.

Comparative Example 3

SnO$_2$ on which calcium amide was supported (hereinafter referred to as Ca(NH$_2$)$_2$/SnO$_2$) was obtained in the same manner as in Example 1 except that a SnO$_2$ (specific surface area: 46 m$^2$/g, manufactured by Wako Pure Chemical Industries, Ltd.) was used as a support. The specific surface area of the metal amide supported powder represented by Ca(NH$_2$)$_2$/SnO$_2$ was 85 m$^2$/g. A composite powder was obtained by supporting metal Ru on Ca(NH$_2$)$_2$/SnO$_2$ (hereinafter referred to as Ru/Ca(NH$_2$)$_2$/SnO$_2$) in the same manner as in Example 1. The specific surface area of Ru/Ca(NH$_2$)$_2$/SnO$_2$ was 65 m$^2$/g.

Figure 5:
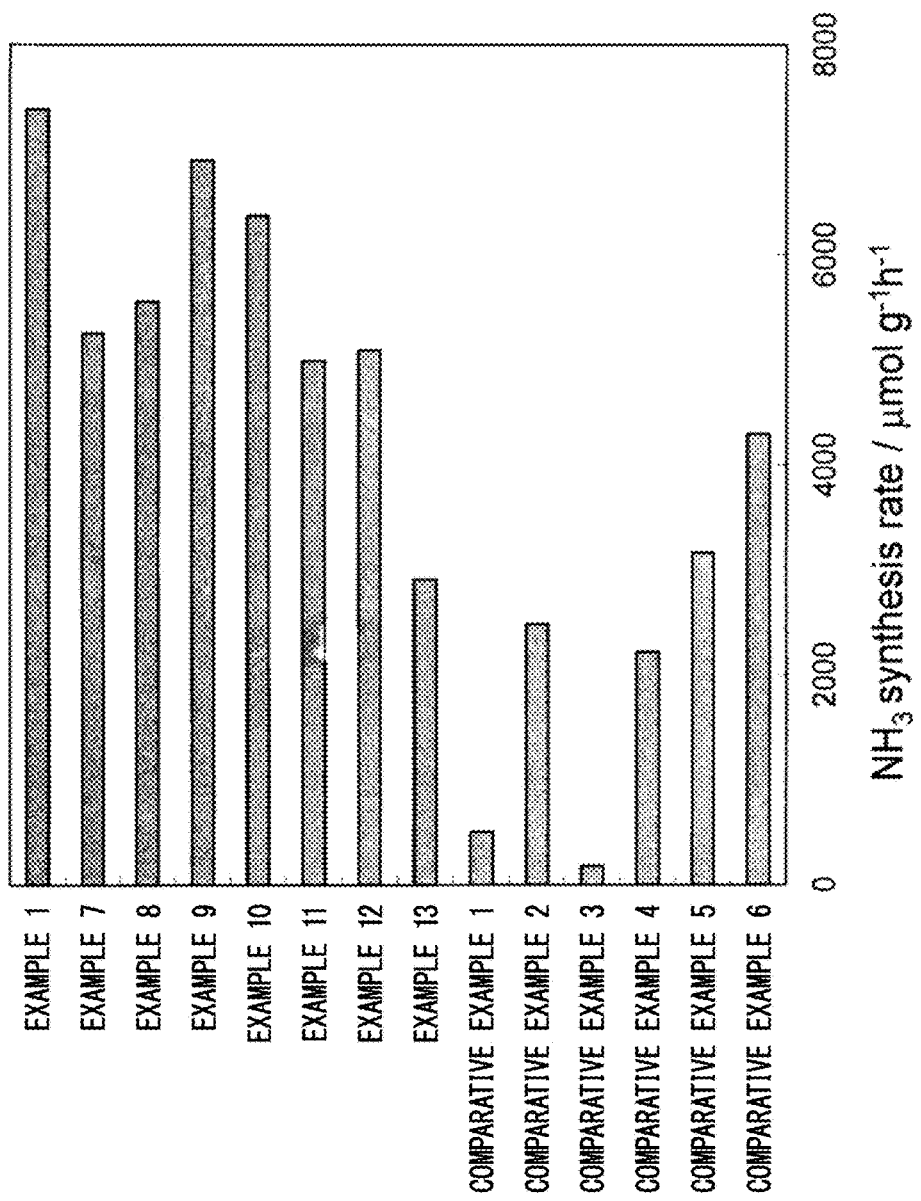
FIG. 5 is a graph showing ammonia synthesis rates of each catalysts when the composites of the present invention produced using various supports are used as ammonia synthesis catalysts.

Ammonia synthesis reaction was carried out in the same manner as in Example 1 except that the composite used as the ammonia synthesis catalyst was Ru/Ca(NH$_2$)$_2$/SnO$_2$. The synthesis rate of ammonia at 340° C. was 182 µmol/g·h as shown in FIG. 5.

Comparative Example 4

<Synthesis of Mayenite Type Compound Powder>

CaCO$_3$ and Al$_2$O$_3$ powders were mixed such that the ratio of Ca to Al was 11:14, and 30 g of the mixture in total was heated at 1300° C. for six hours in an alumina crucible. The obtained powder was put into a silica glass tube and heated at 1100° C. for 15 hours in a vacuum of 1×10$^{-4}$ Pa as to obtain mayenite type compound powder as the raw material. The specific surface area in this stage was 1 m$^2$/g or less.

<Electron Injection by Reduction Processing>

3 g of the powder obtained as described above was put into a silica glass tube together with 0.18 g of a metal Ca powder, and heated at 700° C. for 15 hours so as to react with the powders by setting the inside of the silica glass tube to be in a state of the metal Ca vapor atmosphere. The enclosed sample in the vacuum state was then took out, crushed by using a mortar, and packed in the silica glass tube again and sealing was performed while being in the vacuum state. The sample was heated at 1100° C. for two hours to obtain conductive mayenite type compound powder C12A7:e$^-$ having a concentration of conduction electron of 2×10$^{21}$ cm$^3$ and a specific surface area of 1 m$^2$/g. A supported metal catalyst powder was prepared under the same conditions as in Example 1 except that C12A7:e$^-$ was used as a support. This supported metal catalyst powder is Ru/C12A7:e$^-$ on which Ru 2% by mass was supported. The Ru dispersity measured by the CO adsorption method was 4.7%, and the Ru average particle diameter measured by the CO adsorption method was 28.7 nm.

Using this supported metal catalyst powder, an ammonia synthesis reaction was carried out in the same manner as in Example 1. As shown in FIG. 5, the synthesis rate of ammonia at 340° C. was 2221 µmol/g·h. The TOF was $73.7 \times 10^{-3} s^{-1}$. The activation energy at 340° C. to 250° C. was 91 kJ/mol.

Comparative Example 5

A supported metal catalyst powder represented by $Ru/Ca_3N_2$ on which 2 mass % of Ru was supported was prepared under the same conditions as in Example 1 except that $Ca_3N_2$ was used as a support. The Ru dispersity measured by the CO adsorption method was 3.0%, and the Ru average particle diameter measured by the CO adsorption method was 44 nm.

Using this supported metal catalyst powder, an ammonia synthesis reaction was carried out in the same manner as in Example 1. As shown in FIG. 5, the synthesis rate of ammonia at 40° C. was 3164 µmol/g·h. TOF was $167 \times 10^{-3} s^{-1}$. The activation energy at 340° C. to 250° C. was 66 kJ/mol.

Comparative Example 6

Ammonia synthesis reaction was carried out under the same conditions as in Example 1 except that Ru—Cs/MgO (Ru loading amount: 6 mass %) was used as a supported metal catalyst powder. The synthesis rate of ammonia at 340° C. was 4303 µmol/g·h as shown in FIG. 5.

[Comparison of Ammonia Synthesis Rate]

FIG. 3 shows the results of ammonia synthesis by using $Ru/Ca(NH_2)_2/ZrO_2$ catalyst with different $Ca(NH_2)_2$ loading amounts. As the loading amount of $Ca(NH_2)_2$ increased, the catalytic activity was greatly improved and it was found that the highest activity was exhibited when the loading amount is 40 mass %.

In the case of Example 1, the BET specific surface area of the $ZrO_2$ support is 100 m²/g. The loading amount of the metal amide is 40% by mass with respect to the total amount of the support and the metal amide, therefore, the amount of $Ca(NH_2)_2$ coating the support on the surface area of per 1 m²/g is 0.4% by mass. The minimum amount required for $Ca(NH_2)_2$ to coat a support on a surface area of 1 m²/g is 0.07% by mass. The loading amount in each example is much larger than that amount. It is estimated that since it has at least a certain amount per 1 m²/g of the surface area of the support, the metal amide can sufficiently cover the surface of the support, and as a result, the catalytic activity is improved. On the other hand, if the loading amount is excessively increased, it is suggested that the effect of using the support cannot be obtained.

Figure 4:
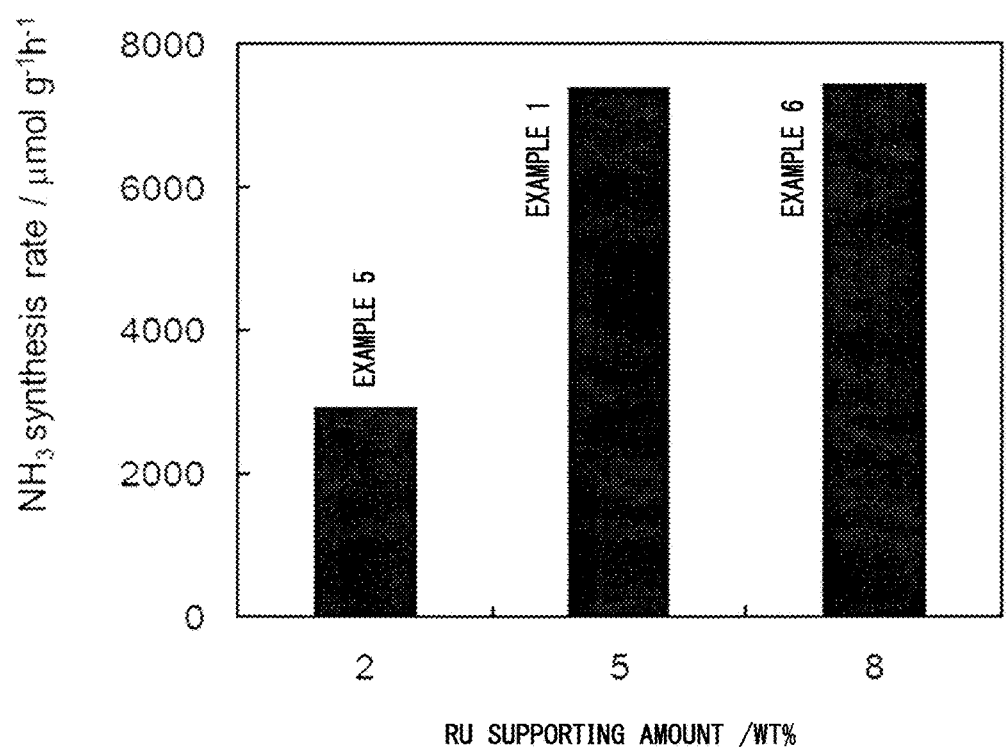
FIG. 4 is a graph showing catalytic activities when a composite in which $Ca(NH_2)_2$ is supported on a $ZrO_2$ support and a different loading amount of Ru is further supported was used as an ammonia synthesis catalyst.

FIG. 4 shows the results of ammonia synthesis when the Ru-loading amount with respect to the total amount of Ru and $Ca(NH_2)_2/ZrO_2$ is 2 mass %, 5 mass %, and 8 mass %. As shown in FIG. 4, in the case of 5% by mass, the activity is considerably higher than that in the case of 2% by mass, but in the case of 8% by mass, there is no great difference as 5% by mass and it was found that sufficient activity was exhibited when the loading amount of 5% by mass was used.

FIG. 5 shows a comparison of ammonia synthesis rates due to different supports. From the viewpoint of ammonia synthesis rate, in comparison with the catalysis in which Ru was supported on C12A7:e⁻ or $Ca_3N_2$, the composite of the present invention, which was obtained by supporting $Ca(NH_2)_2$ and Ru on a metal oxide support such as $ZrO_2$, $CeO_2$, $TiO_2$, MgO or the like, exhibits excellent catalytic performance, by synergistic action of particles of the support, a metal amide compound and transition metal Ru.

On the other hand, as in Comparative Example 2, the catalyst in which Ru was supported on $Ca(NH_2)_2$ which was not supported on a support also exhibited catalytic performance comparable to Ru/C12A7:e⁻ or $Ru/Ca_3N_2$. However, as in Comparative Example 3, the catalyst in which $Ca(NH_2)_2$ and Ru were supported on $SnO_2$ has lower catalytic activity than that the catalysis in which $Ru/Ca(NH_2)_2$ was not supported on the support as in Comparative Example 2. From this, it is clear that when a metal oxide is used as a support, a basic or neutral metal oxide is more suitable as a support than a metal oxide surface having an acidic support surface.

Also, the catalysis using graphite as a support shows high ammonia synthesis rate. Conventionally, when a supported metal catalyst in which metal Ru was supported on a carbonaceous support such as graphite is used, ammonia is hardly produced even if the same reaction is carried out. It does not show catalytic activity. On the other hand, by using the composite of the present invention, even if a carbonaceous support is used, it can be applied to the production of ammonia. The catalyst of the present invention showed higher ammonia synthesizing activity than Ru—Cs/MgO of Comparative Example 6 which is conventionally said to have high activity.

Figure 6:
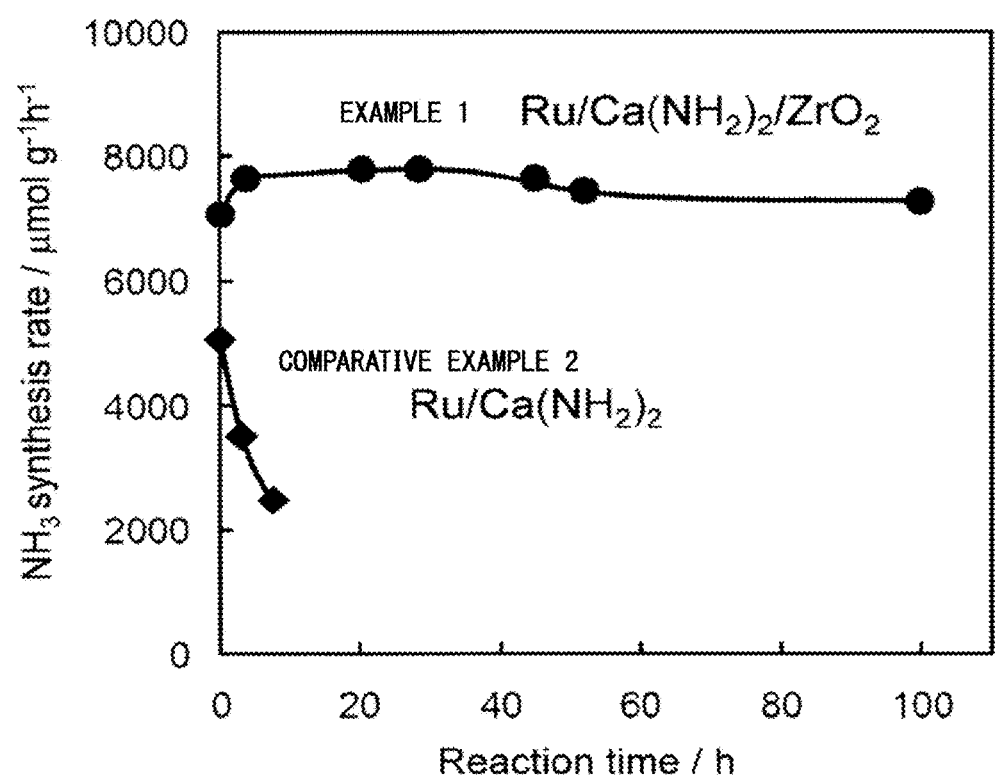
FIG. 6 is a graph showing results of stability evaluation tests on catalysts of Example 1 and Comparative Example 2.

The ammonia synthesis reaction was continued at a reaction temperature of 340° C. for a long time to evaluate the stability of the catalyst. FIG. 6 shows the results of the ammonia synthesis using the amide-enhanced supported metal catalyst represented by $Ru/Ca(NH_2)_2/ZrO_2$ in Example 1 and the results of $Ru/Ca(NH_2)_2$ of Comparative Example 2. The catalyst represented by $Ru/Ca(NH_2)_2$ in Comparative Example 2 in which $Ca(NH_2)_2$ is not supported on the support, the catalyst activity decreases with the reaction time. On the other hand, it was found that the amide-enhanced supported metal catalyst of Example 1 supported on $ZrO_2$ stably produced ammonia for 24 hours, and the reaction activity hardly decreased.

Furthermore, the amide-enhanced supported metal catalyst of the present invention exhibits ammonia synthesizing activity superior to $Ru/Ca_2N$ or Ru/C12A7:e⁻, which are supported metal catalysts using mayenite type compounds containing conduction electrons of $10^{18}$ cm⁻³ or more developed by the present inventors as a support. It also shows higher activity than the Ru—Cs/MgO catalyst, which is said to exhibit high activity.

Table 2 shows the results of comparing the physical properties of each catalyst and ammonia synthesis activities. The amide-strengthen supported metal catalyst of Example 1 represented by $Ru/Ca(NH_2)_2/ZrO_2$ has larger specific surface area, and smaller average particle diameter of the supported Ru than the supported metal catalyst of Comparative Example 4 represented by the conventional Ru/C12A7:e⁻ or the supported metal catalyst of Comparative Example 5 represented by $Ru/Ca_3N_2$. Therefore, even when the loading amount of Ru supported is increased, Ru is supported with good dispersion and the catalysis exhibits high catalytic activity. Furthermore, since the activation energy of ammonia synthesis in each example is equivalent to the supported metal catalyst represented by $Ru/Ca_3N_2$ of Comparative Example 5, the reaction of synthesizing ammonia using a Ca amide as a catalysis has almost the same mechanism as that using a Ca nitride as a catalysis.

In the conventional ammonia synthesis catalyst, the process of cutting strong bonds of nitrogen molecules is regarded as the rate determining step. However, by using the metal amide compound used in the present invention, a strong electron donation from the support to ruthenium occurs. Therefore, the nitrogen-nitrogen triple bond can be efficiently cut. As a result, high activity for ammonia synthesis can be obtained. Even when Fe or Co is used, the same effect can be expected regardless of metal type.

Example 14

(Ammonia Decomposition Reaction)

Figure 7:
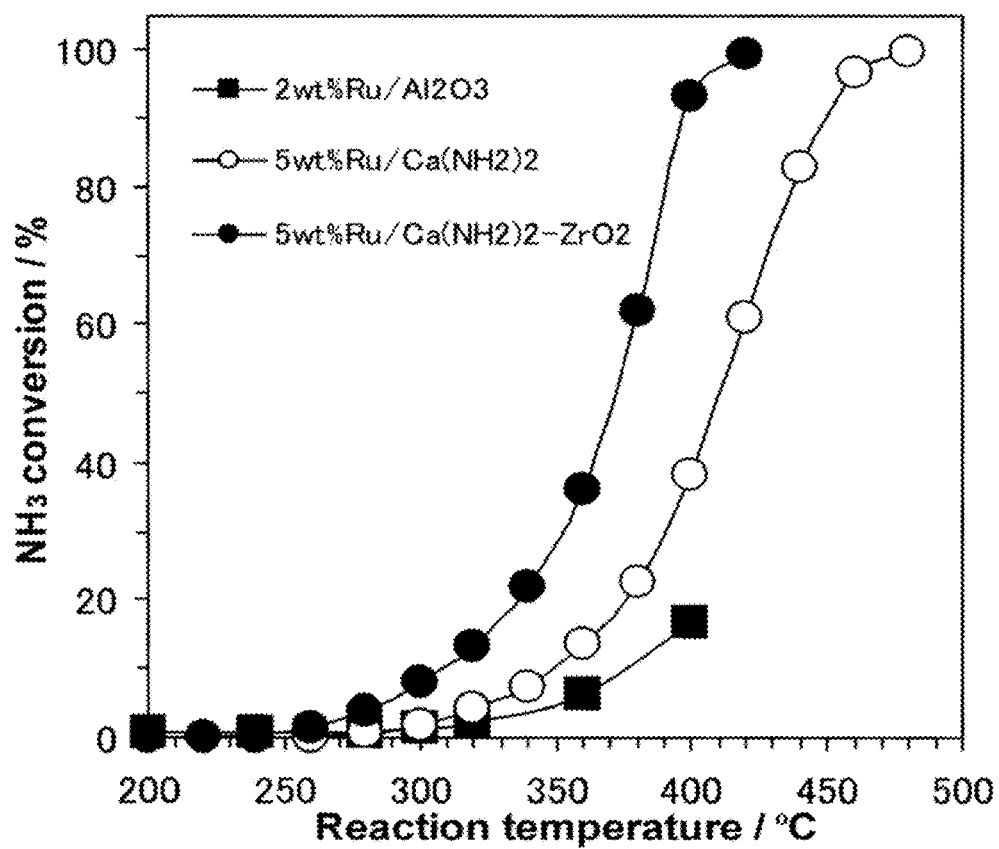
FIG. 7 is a graph showing results of ammonia decomposition reactions shown in Example 14, Comparative Example 7 and Comparative Example 8.

A reaction for decomposing ammonia and producing nitrogen and hydrogen was carried out using the composite prepared in Example 1, $Ru/Ca(NH_2)_2/ZrO_2$ as a supported metal catalyst. 0.1 g of the powder of the composite obtained as described above was packed in a glass tube as an ammonia decomposition catalyst and the reaction was carried out in a fixed bed flow reactor. The flow rate of the gas was set to $NH_3$:5 mL/min, and the reaction was carried out at a pressure of 0.1 MPa. The results are shown in FIG. 7. Gas coming out from the reactor of the distribution system was quantified by gas chromatograph. The decomposition efficiency of ammonia at 400° C. was 93%.

Comparative Example 7

The ammonia decomposition reaction was carried out in the same manner as in Example 14, using $Ru/Ca(NH_2)_2$ prepared in Comparative Example 2 as a catalyst. The results are shown in FIG. 7. The decomposition efficiency of ammonia at 400° C. was 38%.

Comparative Example 8

$Al_2O_3$ (Specific surface area 80 m$^2$/g, manufactured by Alfa Aesar) was heated at 500° C. for 6 hours under vacuum conditions to remove water adsorbed on the surface and the like. Thereafter, in a glove box under an Ar atmosphere, the dehydrated $Al_2O_3$ was placed in a THF solution (60 mL) in which $Ru_3(CO)_{12}$ was dissolved and stirred for 4 hours. At this time, the amount of $Ru_3(CO)_{12}$ was adjusted so that the loading amount of Ru was 2 mass %. The solvent was dried under reduced pressure and subjected to a heat treatment at 450° C. for 1 hour under a vacuum condition for 8 hours to obtain $Ru/Al_2O_3$ in which Ru was supported on $Al_2O_3$.

The ammonia decomposition reaction was carried out in the same manner as in Example 14, using $Ru/Al_2O_3$ obtained above as a catalyst. The results are shown in FIG. 7. The decomposition efficiency of ammonia at 400° C. was 17%.

As shown in Example 14, when the composite of the present invention, as a supported metal catalyst, is used as an ammonia decomposition catalyst, $Ru/Ca(NH_2)_2/ZrO_2$ can decompose ammonia with high efficiency. Compared with the conventional ammonia decomposition catalyst of Comparative Example 8, high decomposition activity was observed. Further, from the comparison with Comparative Example 7, when a composite using a metal oxide as a support was used as a supported metal catalyst, ammonia decomposition reaction proceeds at a lower temperature than the catalyst not using the support. That is, it is very advantageous in that energy can be reduced in the ammonia decomposition reaction.

In the composite of the present invention, a strong electron transfer from the support to the metal occurs. Therefore, when the composite of the present invention is used as a supported metal catalyst, it is considered that high catalytic activity is exhibited for various reactions. By using the composite of the present invention, the stability of the supported metal catalyst is improved. Also, as a supported metal catalyst, it can be expected to be used as various catalysts.

INDUSTRIAL APPLICABILITY

The composite of the present invention has high reactivity as a supported metal catalyst. Therefore, the composite of the present invention can be utilized as various reaction catalysts. In particular, the composite of the present invention can be used as a catalyst for ammonia synthesis, which has a long catalyst life and can be produced even at a low reaction pressure.

What is claimed is:

1. A composite, comprising Ru, a support, and a metal amide compound, wherein:
   the support is at least one metal oxide selected from the group consisting of $ZrO_2$, $TiO_2$, $CeO_2$, and MgO; and
   the metal amide compound is $Ca(NH_2)_2$.

2. The composite according to claim 1, wherein the composite has a BET specific surface area of 10 m$^2$/g or more.

3. A supported metal catalyst, comprising the composite according to claim 1.

4. An ammonia synthesis catalyst, comprising the composite according to claim 1.

5. A method of producing a composite comprising a transition metal, a support, and a metal amide compound, wherein:
   the support is a metal oxide or a carbonaceous support;
   the metal amide compound is a compound represented by formula (1):

$$M(NH_2)_x \quad (1);$$

wherein
   M represents at least one metal atom selected from the group consisting of Li, Na, K, Be, Mg, Ca, Sr, Ba and Eu; and
   x represents the valence of M,
   the method of producing the composite comprising:
   mixing a metal atom source comprising the metal atom M, the support, and liquid ammonia;
   reacting the metal atom source with the liquid ammonia to form a metal amide-supporting support comprising the metal amide compound on the support; and
   supporting the transition metal on the metal amide-supporting support.

6. The method of producing a composite according to claim 5, wherein the supporting of the transition metal on the metal amide-supporting support comprises:
   supporting a transition metal raw material on the metal amide-supporting support; and
   depositing the transition metal by thermally decomposing the transition metal raw material.

7. A method of synthesizing ammonia, the method comprising contacting a gas comprising nitrogen and a gas comprising hydrogen with the ammonia synthesis catalyst according to claim 4 to synthesize ammonia.

8. The method for synthesizing ammonia according to claim 7, wherein a temperature at which the ammonia synthesis catalyst is brought into contact with the ammonia synthesis catalyst is 100° C. or more and 600° C. or less.

9. The method for synthesizing ammonia according to claim 7, wherein the pressure when contacting the ammonia synthesis catalyst is from 10 kPa to 20 MPa.

10. A method of producing the composite according to claim 7, comprising:
    mixing a metal atom source comprising Ca, the support, and liquid ammonia;
    reacting the metal atom source with the liquid ammonia to form metal amide-supporting support comprising the metal amide compound on the support; and
    supporting Ru on the metal amide-supporting support.

11. The composite according to claim 1, wherein the at least one metal oxide selected from the group consisting of $ZrO_2$, $TiO_2$, and $CeO_2$.

* * * * *